(12) United States Patent
Asatani et al.

(10) Patent No.: US 8,019,145 B2
(45) Date of Patent: *Sep. 13, 2011

(54) LEGGED LOCOMOTION ROBOT

(75) Inventors: Minami Asatani, Wako (JP); Masatoshi Okutomi, Tokyo (JP); Shigeki Sugimoto, Tokyo (JP)

(73) Assignees: Honda Motor Co., Ltd., Tokyo (JP); Tokyo Institute of Technology, Tokyo (JP)

( * ) Notice: Subject to any disclaimer, the term of this patent is extended or adjusted under 35 U.S.C. 154(b) by 760 days.

This patent is subject to a terminal disclaimer.

(21) Appl. No.: 12/056,502

(22) Filed: Mar. 27, 2008

(65) Prior Publication Data

US 2008/0310705 A1 Dec. 18, 2008

(30) Foreign Application Priority Data

Mar. 29, 2007 (JP) ................... 2007-089229

(51) Int. Cl.
*G06K 5/00* (2006.01)

(52) U.S. Cl. ........ 382/153; 382/103; 382/106; 382/107; 318/568.1; 318/568.12; 318/568.11; 700/253; 700/245; 700/250; 700/254

(58) Field of Classification Search .................. 382/153, 382/103, 106, 107; 318/568.11, 568.12, 318/568.1; 700/253, 245, 250, 254
See application file for complete search history.

(56) References Cited

U.S. PATENT DOCUMENTS

| | | | |
|---|---|---|---|
| 5,378,969 A | 1/1995 | Haikawa | |
| 7,386,364 B2 * | 6/2008 | Mikami et al. | 700/245 |
| 7,605,347 B2 * | 10/2009 | Izawa et al. | 219/124.34 |
| 2005/0213818 A1 | 9/2005 | Suzuki et al. | |
| 2006/0025888 A1 | 2/2006 | Gutmann et al. | |

FOREIGN PATENT DOCUMENTS

| | | |
|---|---|---|
| JP | 2002144278 | 5/2002 |
| JP | 2002-166380 | 6/2002 |
| JP | 2003346150 | 12/2003 |

OTHER PUBLICATIONS

"A Floor and Obstacle Height Map for 3D Navigation of a Humanoid Robot" (Proceedings of the 2005 IEEE International Conference on Robotics and Automation, Barcelona, Spain, Apr. 2005), English text.

* cited by examiner

*Primary Examiner* — Mike Rahmjoo
(74) *Attorney, Agent, or Firm* — Rankin, Hill & Clark LLP

(57) ABSTRACT

A robot capable of performing appropriate movement control while reducing arithmetic processing for recognizing the shape of a floor. The robot sets a predetermined landing position of steps of the legs on a present assumed floor, which is a floor represented by floor shape information used for a current motion control of the robot, during movement of the robot. An image projection area is set, and is projected on each image captured by cameras mounted on the robot for each predetermined landing position in the vicinity of each of the predetermined landing positions. Shape parameters representing the shape of an actual floor partial area are estimated, forming an actual floor whose image is captured in each partial image area, based on the image of the partial image area generated by projecting the set image projection area on the images captured by the cameras for each partial image area.

12 Claims, 9 Drawing Sheets

FIG.5
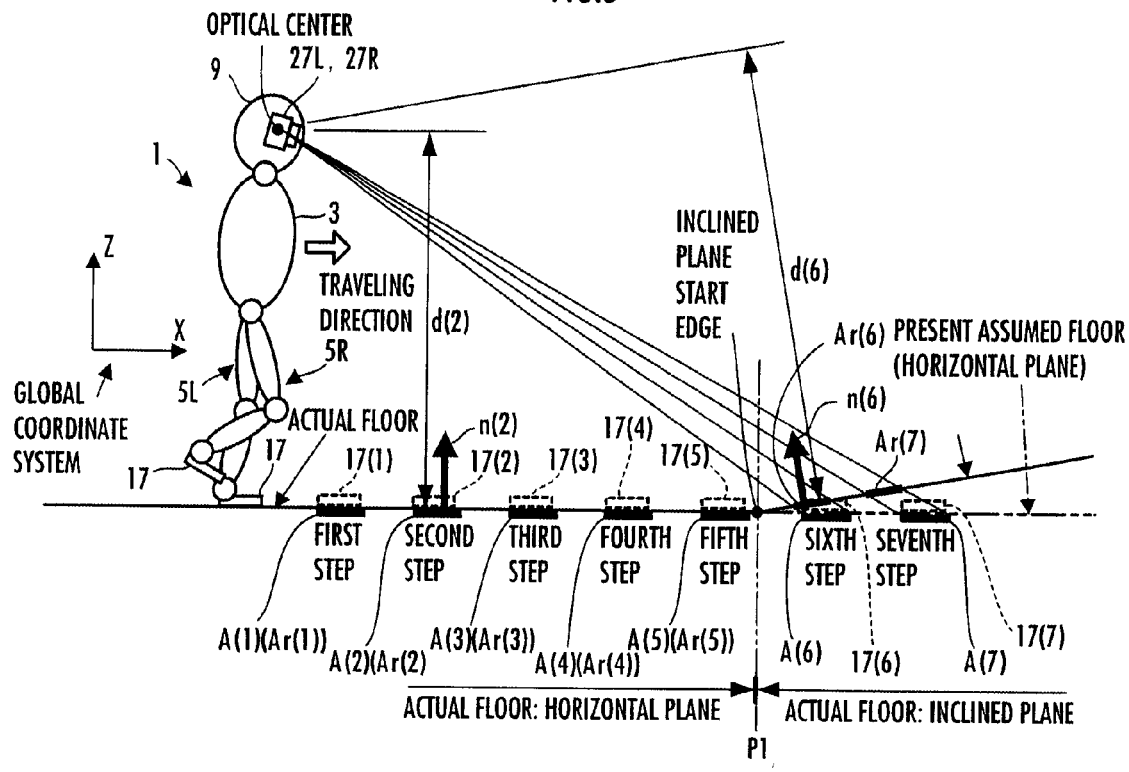
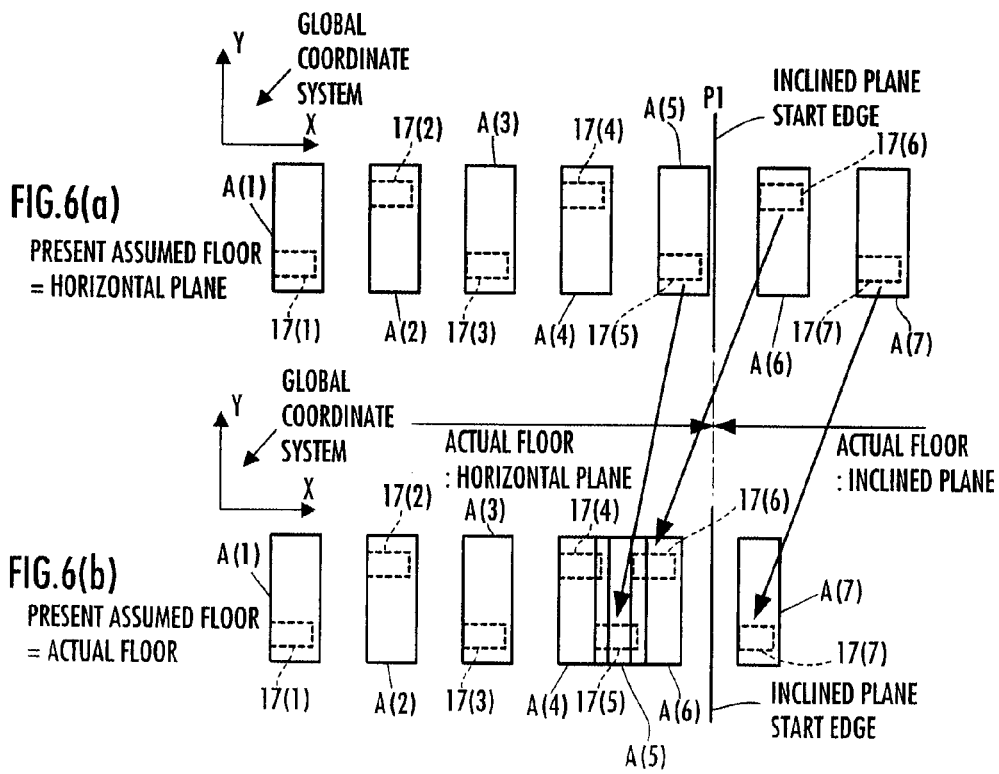
FIG.6(a) PRESENT ASSUMED FLOOR = HORIZONTAL PLANE
FIG.6(b) PRESENT ASSUMED FLOOR = ACTUAL FLOOR

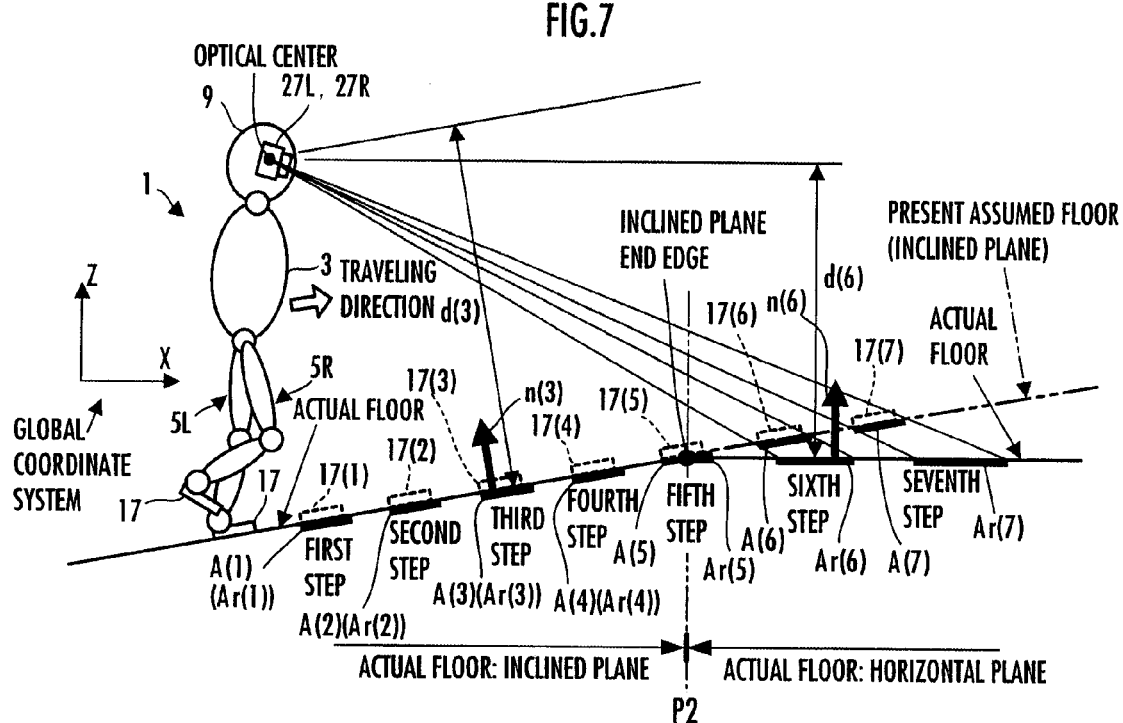
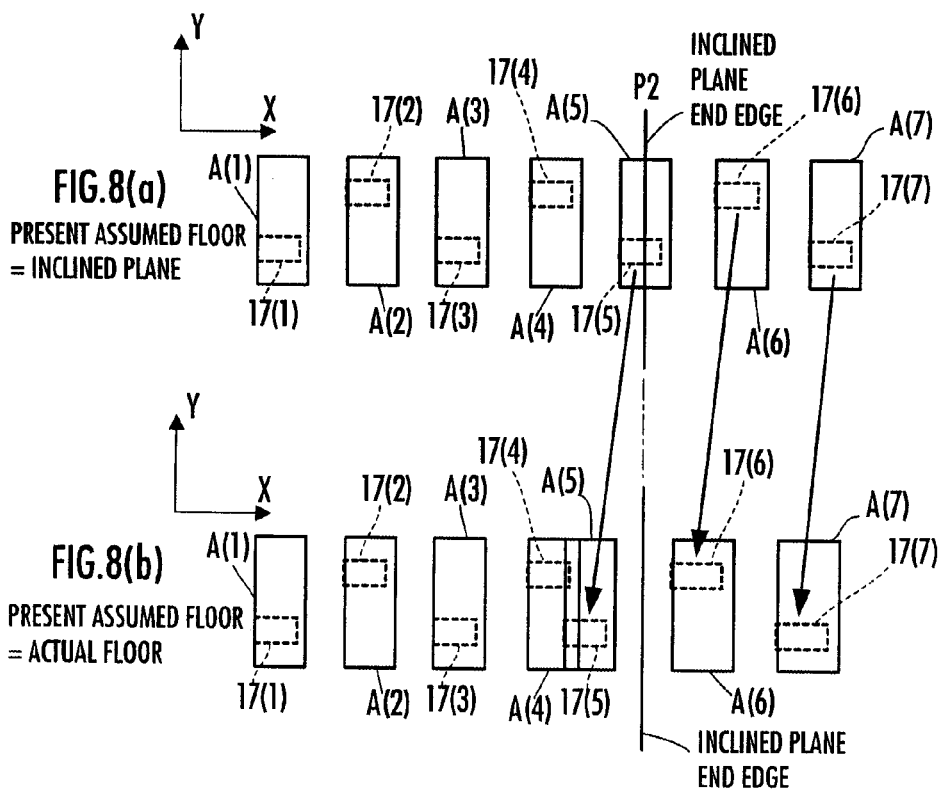

LEGGED LOCOMOTION ROBOT

BACKGROUND OF THE INVENTION

1. Field of the Invention

The present invention relates to a legged locomotion robot, which is equipped with a camera for capturing the surroundings including a floor ahead in the traveling direction of a robot and which moves while recognizing the shape of the floor on the basis of the image captured by the camera.

2. Description of the Related Art

As conventional techniques related to this type of legged locomotion robot, there are known, for example, a technique disclosed in Japanese Patent Application Laid-Open No. 2002-166380 (Document 1) and a technique, titled "A Floor and Obstacle Height Map for 3D Navigation of a Humanoid Robot" by Jens-Steffen Gutmann, Masaki Fukuchi, and Masahiro Fujita (Proceedings of the 2005 IEEE International Conference on Robotics and Automation, Barcelona, Spain, Apr. 2005) (Document 2).

In the technique disclosed in Document 1, the camera captures the surroundings in the wide angle range (for example, 180°) in front of the robot, so that the robot can recognize the shape, size, and position of the terrain or object in the whole area of the captured range on the basis of the captured image. Then, the recognized information is reflected on the motion control of the arms (legs) of the robot.

In the technique disclosed in Document 2, a floor height map is created by measuring the height of each divided area of the floor divided into a grid in the surroundings of the robot on the basis of the image captured by a stereo camera, so that the robot can recognize the floor where it can move in distinction from an obstacle to be avoided.

SUMMARY OF THE INVENTION

Generally speaking, the techniques disclosed in Document 1 and Document 2 are used to recognize the shape of the floor in the whole area of the floor in the image captured by the camera and to use the recognized shape of the floor for robot movement control.

In these technologies, however, the shape of the floor is recognized in the whole area of the floor in the captured image and it therefore requires a lot of arithmetic processing for a one-frame image, which easily leads to time-consuming arithmetic processing. Consequently, particularly in the case of moving the robot at a high speed, the arithmetic processing is too slow to recognize the shape of the floor, which could lead to a difficulty in appropriately performing the movement control of the robot.

The present invention has been provided in view of the above background and therefore it is an object of the present invention to provide a legged locomotion robot capable of appropriate movement control of the robot while reducing arithmetic processing for recognizing the shape of a floor using an image captured by a camera.

In order to achieve the above object, according to the present invention, there is provided a legged locomotion robot, which is equipped with a camera for capturing surroundings including a floor ahead in the traveling direction of a robot and which moves while estimating the shape of the floor based on an image captured by the camera, comprising: a predetermined landing position setting means which sets predetermined landing positions of a plurality of steps of legs of the robot on the present assumed floor which is the floor represented by floor shape information used for a current motion control of the robot during the movement of the robot; an image projection area setting means which sets a flat image projection area projected on the image captured by the camera in the vicinity of each of the set predetermined landing positions therefor; and a floor shape estimation means which estimates shape parameters representing the shape of an actual floor partial area, which is an actual floor captured within each partial image area, for each partial image area on the basis of the image of the partial image area generated by projecting the each set image projection area on the image captured by the camera (First invention).

According to the first invention, the shape parameters of the actual floor partial area are estimated for each of the partial image areas corresponding to the predetermined landing positions of the plurality of future steps of the robot, respectively. Specifically, the shape parameters of the actual floor partial area in the partial image area are estimated only within the partial image area in the image captured by the camera. Consequently, the computational load of the estimation can be reduced. In addition, the partial image area is set so as to be associated with the future predetermined landing position of the robot and therefore shape parameters can be estimated which allows identification of the actual floor shape within a required range for moving motions of the robot. Therefore, according to the first invention, it becomes possible to reduce the arithmetic processing for recognizing the floor shape using the image captured by the camera and to perform appropriate movement control of the robot.

In the first invention, preferably each of the image projection areas includes a ground surface of the leg of the robot in the set predetermined landing position (Second invention).

According to the second invention, it is possible to estimate the shape of an actual floor in and around a future ground surface of the leg of the robot.

Moreover, in the first invention, preferably the shape parameters representing the shape of the actual floor partial area captured within the each partial image area include a posture parameter which represents a spatial posture of a plane including at least the actual floor partial area and a position parameter representing a spatial position of the plane (Third invention).

According to the third invention, it is possible to recognize in which position and how the actual floor ahead in the traveling direction of the robot is inclined from the estimated value of the shape parameters of each actual floor partial area. The posture parameter may be a parameter representing a normal line direction of the plane such as, for example, a normal vector of a plane including the actual floor partial area. The position parameter may be, for example, a parameter representing a distance from a specific representative point in a space to a plane including the actual floor partial area or a spatial position of an arbitrary point on the plane.

In the third invention, for example, the camera includes two cameras and the floor shape estimation means estimates the shape parameters of the actual floor partial area corresponding to the image projection area in such a way as to determine a projective transformation matrix capable of transforming the image of the partial image area of one camera corresponding to the image projection area to an image coincident with the image of the partial image area of the other camera for the each set image projection area (Fourth invention).

Note here that the projective transformation matrix capable of transforming the image of the partial image area of one camera corresponding to the image projection area to an image coincident with the image of the partial image area of the other camera depends on the spatial posture and position of the plane including the actual floor partial area corresponding to the partial image area. Therefore, it is possible to identify the shape parameters (the posture parameter and the position parameter) of the actual floor partial area by determining the projective transformation matrix.

In the fourth invention, more specifically, the floor shape estimation means regards the shape parameters of the actual floor partial area corresponding to the partial image area as variable parameters in estimating the shape parameters of the actual floor partial area corresponding to arbitrary one of the set image projection areas, performs a convergence calculation of updating values of the variable parameters from initial values in such a way as to converge a plane defined by the values of the variable parameters into a plane including the actual floor partial area, while comparing an image generated by transforming the image of the partial image area of the one camera by using a temporary projective transformation matrix, which is determined according to values of the variable parameters, with an image of the partial image area of the other camera, and determines convergence values of the variable parameters obtained by the convergence calculation as estimated values of the shape parameters of the actual floor partial area corresponding to the partial image area (Fifth invention).

According to the fifth invention, it is possible to obtain the estimated values of the shape parameters of the actual floor partial area in an exploratory manner. Although it is necessary in this case to perform a process of transforming the image of the partial image area of the above one camera using the temporary projective transformation matrix determined according to the values of the variable parameters and a process of comparing the image obtained by the transformation with the image of the partial image area of the other camera each time the values of the variable parameters are updated, these processes are limited to partial areas within the images captured by the cameras and therefore it is possible to perform these processes in a relatively short time.

In the fifth invention, preferably the floor shape estimation means includes a means which sets the initial values to values satisfying a limiting condition that should be satisfied by the initial values, where the limiting condition is that the plane defined by the initial values of the variable parameters is inclined with respect to the plane including the actual floor partial area (Sixth invention).

Although the details will be described later, more specifically, the present inventor's findings regarding the initial values of the variable parameters updated in the convergence calculation are as follows: the number of iterative operations in the convergence calculation tends to rapidly increase along with an increase in error in spatial position between a plane defined by the initial values of the variable parameters (hereinafter, referred to as the initial plane in some cases) and a plane including the actual floor partial area (hereinafter, referred to as the actual plane in some cases) in the case where the initial plane is in parallel with the actual plane. Furthermore, if the error in spatial position between the initial plane and the actual plane increases to some extent, the values of the variable parameters cannot be converged to certain values. In other words, in the case where the initial values of the variable parameters are set to values that allow the initial plane and the actual plane to be in parallel with each other, the computational load in the convergence calculation rapidly increases or the parameter values cannot be converged unless the initial values are set in such a way as to prevent a large error in spatial position between the initial plane and the actual plane.

On the other hand, in the case where the initial values of the parameters of the projective transformation matrix are set in such a way that the initial plane is inclined to some extent with respect to the actual plane, the number of iterative operations in the convergence calculation does not rapidly increase even in the case of a relatively large error in spatial position between the initial plane and the actual plane, and it is possible to converge the values of the parameters with a relatively small number of iterative operations.

Therefore, according to the sixth invention, the computational load can be reduced while securing the convergence property of the convergence calculation even in the case of a relatively large error in position between the initial plane and the actual plane defined by the initial values.

Note here that the tilt angle from the horizontal plane of the floor where the robot is to be moved is generally within a certain range of values and the allowable range of the values of the tilt angle depends on the specifications of the robot or the operating environment of the robot.

Therefore, in the sixth invention, preferably the plane defined by the initial values of the variable parameters has a tilt angle with respect to the horizontal plane equal to a given angle, which has been previously determined so as to deviate from the range of values that can be used as an actual tilt angle with respect to the horizontal plane of the plane including the actual floor partial area (Seventh invention).

According to the seventh invention, it is possible to set initial values reliably satisfying the limiting condition by setting the initial values of the parameters defining the initial plane so that the initial plane has the tilt angle equal to the given angle with the given angle set to the value deviating from the range independently of the degree of inclination of the actual floor partial area in the actual floor where the robot is to be moved.

Preferably the third invention further includes an inclined change portion identification means which identifies an inclined change portion where the degree of inclination of an actual floor ahead in the traveling direction of the robot changes, on the basis of the estimated shape parameters of the actual floor partial area (Eighth invention).

Thus, it is possible to generate a gait of the robot such that the legs of the robot are landed avoiding the inclined change portion during the movement of the robot by identifying the inclined change portion.

In the eighth invention, more specifically, the inclined change portion identification means includes: a means which divides, for example, the actual floor partial areas corresponding to the respective image projection areas into a first front-side group located nearer to the robot and a first back-side group located farther from the robot than the first front-side group and which performs the division in such a way as to minimize the distribution of the shape parameters of the actual floor partial areas belonging to the first front-side group and the distribution of the shape parameters of the actual floor partial areas belonging to the first back-side group; a means which determines temporary representative values of the shape parameters of the actual floor partial areas belonging to the first front-side group obtained by the division and temporary representative values of the shape parameters of the actual floor partial areas belonging to the first back-side group and determines the magnitude of difference between two planes defined by the temporary representative values; a means which determines a temporary inclined change portion as temporary values of the inclined change portion on the basis of the temporary representative values that define the two planes, respectively, in the case where the degree of difference between the two planes is determined to be high; and a first inclined change portion identification means which identifies the inclined change portion on the basis of the shape parameters of the actual floor partial area excluding an actual floor partial area close to the temporary inclined change portion from the actual floor partial areas belonging to the first front-side group and the shape parameters of the actual floor partial areas excluding an actual floor partial areas close to the temporary inclined change portion from the actual floor partial areas belonging to the first back-side group (Ninth invention).

According to the ninth invention, the actual floor partial areas corresponding to the image projection areas are divided so as to minimize the distribution (the degree of variation) of the shape parameters of the actual floor partial areas belonging to the first front-side group and the distribution (the degree of variation) of the shape parameters of the actual floor partial areas belonging to the first back-side group, and therefore the shape parameters of the actual floor partial areas belonging to each group are extremely approximate to each other. Moreover, in the case of a high degree of difference between two planes (for example, difference in the degree of inclination between two planes) defined by the temporary representative values (for example, average values) of the shape parameters of the actual floor partial areas belonging to the respective groups, it is thought that an inclined change portion exists around a portion between the actual floor partial area belonging to the first front-side group and the actual floor partial area belonging to the first back-side group. Therefore, the temporary inclined change portion is determined based on the temporary representative values of the shape parameters for each group. In this determination, for example, the intersection between two planes defined by the temporary representative values of the shape parameters of the respective groups can be determined as the temporary inclined change portion.

Note that, however, a back-side actual floor partial area among the actual floor partial areas belonging to the first front-side group divided as described above or a front-side actual floor partial area among the actual floor partial areas belonging to the first back-side group may include an actual inclined change portion inside the back-side or front-side actual floor partial area. If this is the case, the estimated values of the shape parameters of the actual floor partial area are low in reliability. Therefore, in the ninth invention, the inclined change portion is identified based on the shape parameters of the actual floor partial areas excluding the actual floor partial area close to the temporary inclined change portion from the actual floor partial areas belonging to the first front-side group and the shape parameters of the actual floor partial areas excluding an actual floor partial area close to the temporary inclined change portion from the actual floor partial areas belonging to the first back-side group. This enables the inclined change portion to be appropriately identified.

In the ninth invention, the first inclined change portion identification means determines representative values (for example, average values) of the shape parameters of the actual floor partial areas excluding an actual floor partial area close to the temporary inclined change portion from the actual floor partial areas belonging to the first front-side group and representative values (for example, average values) of the shape parameters of the actual floor partial areas excluding an actual floor partial area close to the temporary inclined change portion from the actual floor partial areas belonging to the first back-side group and identifies an intersection between two planes defined by the representative values as the inclined change portion (Tenth invention).

Moreover, in the ninth invention, preferably the inclined change portion identification means includes: a means which divides the actual floor partial areas corresponding to the image projection areas, respectively, into a second front-side group located nearer to the robot than a given position and a second back-side group located farther from the robot than the second front-side group in the case where the degree of difference between the two planes defined by the temporary representative values is determined to be low; and a second inclined change portion identification means which identifies the inclined change portion on the basis of the shape parameters of the actual floor partial areas belonging to the second back-side group obtained by the division and information on the shape of a floor in the vicinity of a current ground contact point of the robot on the present assumed floor (11th invention).

In other words, in the situation where the degree of difference between two planes defined by the temporary representative values is determined to be low, mainly the two planes are almost identical, in other words, it shall be deemed that the actual floor partial areas belonging to the first front-side group and the actual floor partial areas belonging to the first back-side group exist on the almost same plane. Also in the case where, for example, the degree of inclination of the actual floor gradually changes in the traveling direction of the robot, however, the degree of difference between two planes defined by the temporary representative values may be determined to be low in some cases. Therefore, in the 11th invention, the actual floor partial areas corresponding to the image projection areas, respectively, are divided into the second front-side group and the second back-side group as described above and then the inclined change portion is identified based on the shape parameters of the actual floor partial areas belonging to the second back-side group obtained by the division and the information on the shape of the floor around the current ground contact point of the robot on the present assumed floor. Thereby, even if the degree of inclination of the actual floor gradually changes in the traveling direction of the robot, it is possible to identify the inclined change portion in a phased manner by approximating the change of the degree of inclination.

Regarding the given position for dividing the actual floor partial areas into the second front-side group and the second back-side group, it is possible to define the position by the number of steps for the predetermined landing position set by the predetermined landing position setting means or by a distance from the current position of the robot.

In the 11th invention, more specifically, the second inclined change portion identification means includes, for example, a means which determines representative values of the shape parameters of the actual floor partial areas belonging to the second back-side group and a means which determines the degree of difference between the floor in the vicinity of the current ground contact point of the robot on the present assumed floor and a plane defined by representative values of the shape parameters of the actual floor partial areas belonging to the second back-side group and, in the case where the means determines that the degree of difference between the floor and the plane is high, the second inclined change portion identification means identifies the inclined change portion on the assumption that the inclined change portion exists in the middle position between the predetermined landing position corresponding to the actual floor partial area closest to the second back-side group among the actual floor partial areas belonging to the second front-side group and the predetermined landing position corresponding to the actual floor partial area closest to the second front-side group among the actual floor partial areas belonging to the second back-side group (12th invention).

This enables the inclined change portion to be appropriately identified.

In the present invention, it is desirable to modify the present assumed floor, which is located at least ahead in the traveling direction of the robot and on the back side of the identified inclined change portion, in the present assumed floor described above according to the identified inclined change portion and the representative values of the shape parameters of the actual floor partial areas belonging to the back-side group (the first back-side group or the second back-side group). In this modification, it is desirable to modify the present assumed floor in the case of a higher degree of difference (for example, difference in the degree of inclination) between the inclined change portion, the identified inclined change portion and the estimated floor (the estimated floor approximating the entire actual floor partial areas belonging to the back-side group) represented by the representative values of the shape parameters of the actual floor partial areas belonging to the back-side group (the first back-side group or the second back-side group) than a given value.

BRIEF DESCRIPTION OF THE DRAWINGS

FIG. 5 is a diagram for explaining a setting example of predetermined landing positions of a plurality of steps of robot's feet and image projection areas.

FIG. 6(a) and FIG. 6(b) are diagrams for explaining a setting example of predetermined landing positions of the plurality of steps of the robot's feet and the image projection areas.

FIG. 7 is a diagram for explaining a setting example of predetermined landing positions of a plurality of steps of robot's feet and image projection areas.

FIG. 8(a) and FIG. 8(b) are diagrams for explaining a setting example of the predetermined landing positions of the plurality of steps of the robot's feet and the image projection areas.

DETAILED DESCRIPTION OF THE PREFERRED EMBODIMENTS

One embodiment of the present invention will be described with reference to FIG. 1 to FIG. 11.

Figure 1:
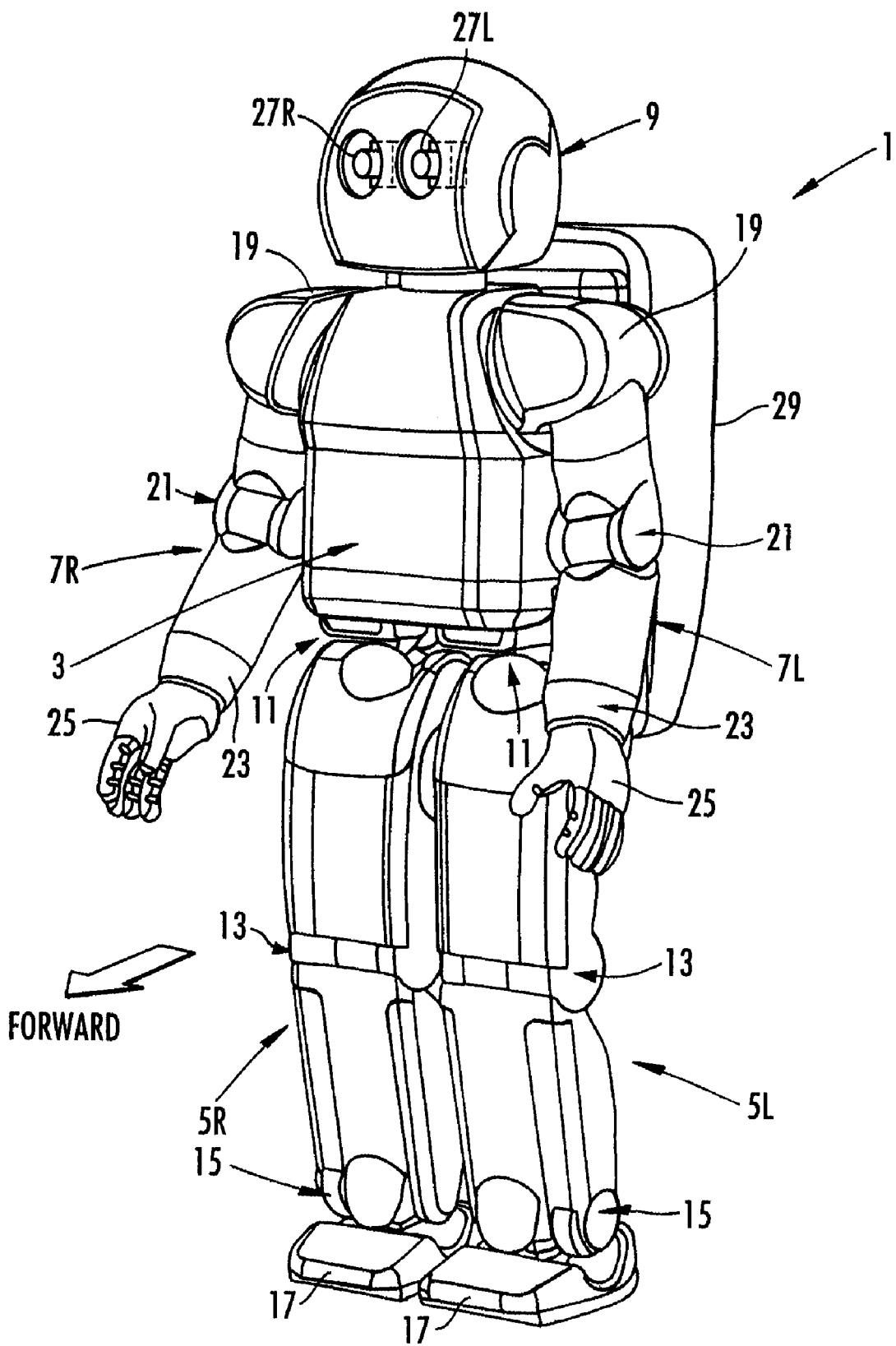
FIG. 1 is an appearance perspective view of a bipedal walking robot, which is a legged locomotion robot in one embodiment of the present invention.
Figure 2:
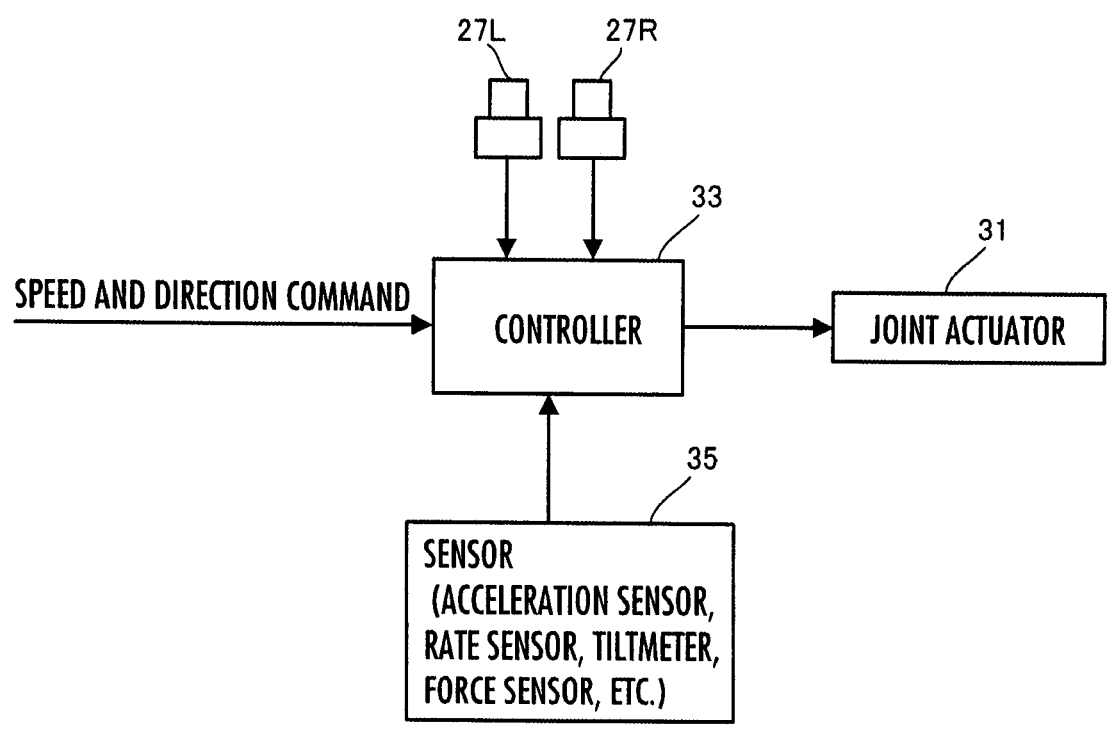
FIG. 2 is a block diagram illustrating a schematic configuration of a control system mounted on the robot shown in FIG. 1.

First, a schematic configuration of a legged locomotion robot in this embodiment will be described with reference to FIG. 1 and FIG. 2. FIG. 1 shows an appearance perspective view of a bipedal walking robot as a legged locomotion robot in this embodiment and FIG. 2 shows a block diagram illustrating an outline of a control system of the robot.

The bipedal walking robot 1 is a humanoid robot, having a body (base) 3, a pair of left and right legs 5L and 5R, a pair of left and right arms 7L and 7R, and a head 9. In the description of this embodiment, references "L" and "R" are used as references representing the left element and the right element of the robot 1 facing front, respectively. Note that, however, the references "L" and "R" are omitted if there is no particular need to distinguish between left and right.

The legs 5L and 5R have the same structure, extending from a leftward portion of a lower end of the upper body 3 and a rightward portion thereof via hip joints 11, respectively. Additionally, each leg 5 has a knee joint 13 in the middle portion in its longer direction. Furthermore, a foot 17 as a ground contact portion is attached to the end (lower end) of each leg 5 via an ankle joint 15. In this embodiment, the hip joint 11, the knee joint 13, and the ankle joint 15 of each leg 5 have three degrees of freedom, one degree of freedom, and two degrees of freedom, respectively. Therefore, the foot 17 has six degrees of freedom for the upper body 3.

The left and right arms 7L and 7R have the same structure, extending from the left side of an upper portion of the body 3 and the right side thereof via shoulder joints 19, respectively. In addition, each arm 7 has an elbow joint 21 in its middle portion in the longer direction. Furthermore, a hand (palm and fingers) 25 is attached to the end of each arm 7 via a wrist joint 23. In this embodiment, the shoulder joint 19, the elbow joint 21, and the wrist joint 23 have three degrees of freedom, one degree of freedom, and two degrees of freedom, respectively. Therefore, the hand 25 has six degrees of freedom for the body 3.

The head 9 is mounted on the top end of the body 3. The head 9 includes a pair of left and right cameras 27L and 27R. These cameras 27L and 27R are each formed of, for example, a CCD camera. The cameras 27L and 27R are used to capture the surroundings of the front of the head 9 (generally ahead of the robot 1). Then, the cameras 27L and 27R are fixed to the head 9 so that their optical axes point substantially in the same direction toward the front of the head 9. Furthermore, the head 9 includes a joint mechanism (not shown) that allows the head 9 to move with respect to the body 3. The joint mechanism causes the head 9 to be movable with respect to the body 3 in such a way as to be integral with the cameras 27L and 27R. For example, the head 9 is capable of rotating motion around the trunk axis (generally a vertical axis) of the body 3 and of rotating motion around an axis in the right/left direction. Alternatively, the head 9 may be fixed to the body 3.

In addition, a box 29 is attached to the rear of the body 3 and the box 29 contains a controller 33 described later.

The robot 1 includes a control system shown in FIG. 2 to control its motions (walking and the like). The control system has a joint actuator 31 which drives the above joints of the legs 5, the arms 7 and the head 9, the controller 33 which controls the motions (movements) of the robot 1 via the joint actuator 31, and a sensor 35 which detects various internal state quantities of the robot 1. Although only one joint actuator 31 is shown in FIG. 2, the joint actuator 31 is provided for each of the above joints of the legs 5, the arms 7, and the head 9. In addition, the joint actuator 31 is formed of an electric motor or the like.

Although the details of the sensor 35 is not shown, the sensor 35 includes an acceleration sensor which detects 3-axis acceleration of a predetermined portion such as, for example, the body 3 of the robot 1, a rate sensor which detects a 3-axis angular velocity of the body 3, a tiltmeter which detects a tilt angle (the tilt angle with respect to the vertical direction) of the body 3, and a force sensor (6-axis force sensor) which detects a floor reaction force (a 3-axis translational force and a moment around three axes) that acts on each foot 17 of the robot 1 from the floor side.

The controller 33 is an electronic circuit unit including a CPU, a RAM, a ROM, an interface circuit, a drive circuit for the joint actuator 31 and the like. The controller 33 accepts inputs of images captured by the cameras 27L and 27R and inputs of detection signals of the sensor 35. Furthermore, the controller 33 accepts an input of a command that defines the moving speed and moving direction (traveling direction) of the robot 1 (the command is hereinafter referred to as the speed and direction command) transmitted from a remote control device (not shown) of the robot 1. Moreover, the controller 33 generates a desired gait of the robot 1 by performing required arithmetic processing using the above input data. Furthermore, the controller 33 determines desired motions of the joints provided on the robot 1 such as the hip joints 11, the knee joints 13, and the ankle joints 15 of each leg 5 according to the generated desired gait. Thereafter, the controller 33 moves the robot 1 by controlling the joint actuators 31 according to the desired motions.

Moreover, in this embodiment, the controller 33 sequentially recognizes the self-positions of the robot 1 in the global coordinate system (world coordinate system), which is fixed with respect to the floor where the robot 1 is to be moved, on the basis of detection signals from the sensor 35 (for example, the acceleration sensor and the rate sensor). Alternatively, the self-positions of the robot 1 may be recognized by using an appropriate external sensor. For example, it is also possible to recognize the self-position of the robot 1 on the basis of landmarks in the images captured by the cameras 27L and 27R with the landmarks previously provided on the floor where the robot 1 is to be moved.

Moreover, in this embodiment, the controller 33 performs a process of estimating the shape of the floor where the robot 1 is to be moved by using the images captured by the cameras 27L and 27R.

Although the speed and direction command of the robot 1 is entered from the remote control device to the controller 33 in this embodiment, alternatively it is possible to previously teach the controller 33 the speed and direction command or a movement plan of the robot 1 for specifying the speed and direction command.

Among control processes performed by the controller 33 of the robot 1, the control processes related to the present invention will be described in detail below with reference to FIG. 3 to FIG. 11. The controller 33 sequentially estimates the shapes of the floor ahead in the traveling direction of the robot 1 on the basis of the images captured by the cameras 27L and 27R while performing a control process of moving the robot 1 according to the speed and direction command (a motion control process of the robot 1).

Figure 3:
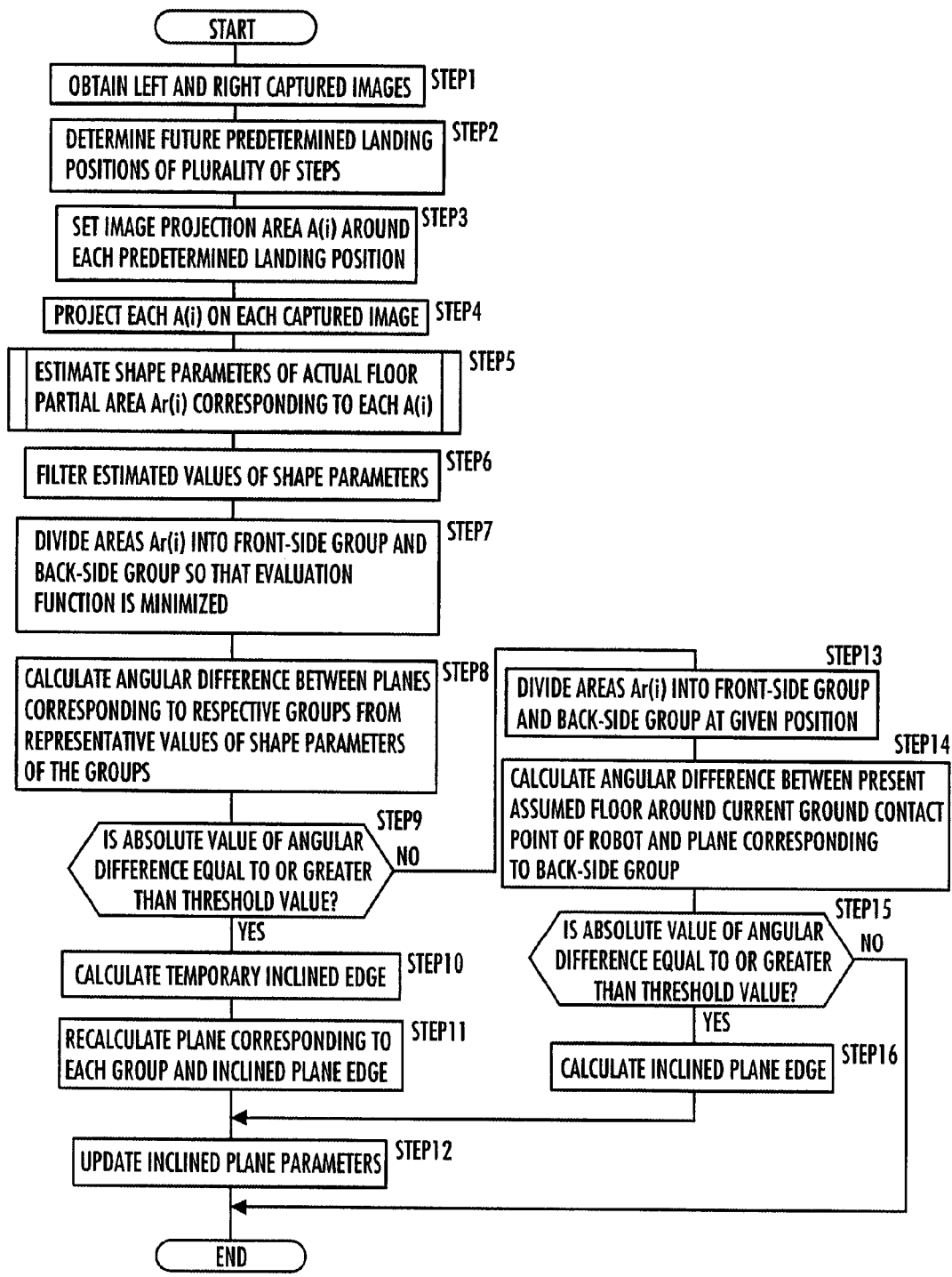
FIG. 3 is a flowchart illustrating an estimation of a floor shape in the embodiment.

Referring to FIG. 3, there is shown a flowchart showing an estimation process of the floor shape (hereinafter, referred to as the floor shape estimation).

The floor shape estimation is sequentially performed at predetermined arithmetic processing intervals in parallel with the motion control of the robot 1.

The terms used in the following description will be supplementarily described here. Each arithmetic processing period in the floor shape estimation is referred to as the frame, the current arithmetic processing period is referred to as the current frame, and an arithmetic processing period immediately preceding the current frame is referred to as the previous frame. In addition, a floor that the controller 33 assumes at present for the motion control of the robot 1 (the floor whose area includes the current position of the robot 1) is referred to as the present assumed floor, the real floor is referred to as the actual floor, and the floor estimated in the floor shape estimation is referred to as the estimated floor.

The present assumed floor is defined by information on the floor shape necessary for the motion control of the robot 1. The information on the floor shape includes the position of an inclined plane or horizontal plane in the global coordinate system, the gradient of the inclined plane, or the like and the information is entered into the controller 33 before the start of the motion of the robot 1. Basically, the controller 33 controls the motions of the robot 1 on the assumption that the floor where the robot 1 is to be moved matches the present assumed floor. In this process, the present assumed floor ahead in the traveling direction of the robot 1 is updated according to the estimated floor in the case where a difference between the present assumed floor and the estimated floor (for example, a difference in a tilt angle between these floors) is large to some extent in this embodiment. It is assumed that the present assumed floor in the vicinity of the ground contact point of the robot 1 is in a horizontal plane and approximately matches the actual floor when the robot 1 starts the motion.

Among the feet 17, 17 of the robot 1, the foot 17 lifted in the air (caused to leave the floor) during the movement of the robot 1 is referred to as the free leg's foot 17 and the other foot 17 (the foot 17 of the leg 5 that supports the own weight of the robot 1 on the floor) is referred to as the supporting leg's foot 17. In the case of continuously moving the robot 1, the free leg's foot 17 and the supporting leg's foot 17 are alternately switched to each other.

Moreover, it is assumed that the image captured by one of the cameras 27L and 27R is considered as a standard image in a stereo image and the image captured by the other camera is considered as a reference image in the stereo image in this embodiment. In the following description, the image captured by the camera 27L may be considered as a standard image and the camera 27L may be referred to as the standard camera 27L for convenience in some cases.

On the premise of the above, the floor shape estimation will be described below. Referring to FIG. 3, the controller 33 first obtains the left and right captured images (the standard image and the reference image) from the cameras 27L and 27R in step 1 in the floor shape estimation.

Next in step 2, the controller 33 determines future predetermined landing positions of the free leg's foot 17 of the robot 1 of a plurality of steps from the first to Nth steps on the basis of the entered speed and direction command, the shape of the present assumed floor, and a gait parameter used by the controller 33 to generate the desired gait of the robot 1. The predetermined landing position of the first step is the predetermined landing position of the current free leg's foot 17 of the robot 1. The process of step 2 constitutes a predetermined landing position setting means in the present invention.

In this embodiment, the predetermined landing positions determined in step 2 are, for example, those of the first to seventh steps (N=7). The predetermined landing positions are in the global coordinate system. In addition, the predetermined landing positions mean the positions of the representative points of the foot 17.

In this embodiment, the gait parameter that the controller 33 uses to generate the desired gait of the robot 1 includes gait parameters that define the predetermined landing position of the free leg's foot 17 in the first-step gait (hereinafter, referred to as the current time gait in some cases) (the predetermined landing position of the current free leg's foot 17), the predetermined landing position of the free leg's foot 17 in the second-step gait as the next time gait (hereinafter, referred to as the next time gait in some cases) (the predetermined landing position of the free leg's foot 17 subsequent to the current free leg's foot 17), and the landing position of the foot 17 for each step in a normal gait which is a virtual cyclic gait (a cyclic gait whose one cycle corresponds to two steps) which follows the current time gait. The predetermined landing positions of the free leg's foot 17 of the current time gait and the next time gait and the landing position of the free leg's foot 17 in the normal gait defined by the above gait parameters are in the coordinate system fixed with respect to the robot 1 (for example, a coordinate system with the origin at a given representative point within the ground surface of the current supporting leg's foot 17 of the robot 1).

The predetermined landing positions of the free leg's foot 17 of the current time gait and the next time gait defined by the gait parameters are determined according to a predetermined given rule on the basis of the speed and direction command entered into the controller 33 and the shape information on the present assumed floor (the present assumed floor in the vicinity of the current ground contact point of the robot 1). In this instance, the predetermined landing positions of the free leg's foot 17 in the current time gait and the next time gait are set so that the free leg's foot 17 comes in contact with the present assumed floor in the predetermined landing positions. Furthermore, regarding the normal gait which is the virtual cyclic gait that follows the current time gait, the landing position of the supporting leg's foot 17 and the landing position of the free leg's foot 17 in the first-step gait of each cycle (cycle of two steps) are determined in such a way that a relative positional relationship between them coincides with the relative positional relationship between the landing position of the supporting leg's foot 17 in the next time gait (namely the predetermined landing position of the free leg's foot 17 in the current time gait) and the predetermined landing position of the free leg's foot 17 in the next time gait. Furthermore, the landing position of the supporting leg's foot 17 (namely the predetermined landing position of the free leg's foot 17 in the first-step gait of the normal gait) and the landing position of the free leg's foot 17 in the second-step gait of each cycle in the normal gait are determined in such a way that a relative positional relationship between them coincides with the relative positional relationship between the landing position of the supporting leg's foot 17 in the current time gait and the predetermined landing position of the free leg's foot 17 in the current time gait.

The normal gait is a virtual gait that is generated to determine the condition for generating the current time gait (a favorable condition for stabilizing the moving of the robot 1), but is not a gait used to control the actual motion of the robot 1. In addition, one cycle of the normal gait does not need to be composed of two steps, but may be composed of three or more steps. Since the normal gait is described in detail, for example, in PCT International Laid-Open No. WO 02/40224 of the application concerned or the like, its detailed description will be omitted in this specification.

Then, in step 2, the controller 33 determines the predetermined landing positions of the steps up to the third step on the basis of the above-mentioned gait parameters used by the controller 33 to generate the desired gait (the current time gait) of the robot 1. More specifically, the predetermined landing position of the first step (the predetermined landing position of the free leg's foot 17 in the current time gait) and the predetermined landing position of the second step (the predetermined landing position of the free leg's foot 17 in the next time gait) defined by the gait parameters are transformed to the global coordinate system and are then directly determined as the predetermined landing positions of the feet 17 of the steps up to the second step. In addition, the landing position of the second step of the first cycle in the normal gait defined by the above gait parameter is transformed to the global coordinate system and is then determined as the predetermined landing position of the third step.

Furthermore, the controller 33 determines the predetermined landing positions of the fourth to Nth steps (N=7 in this embodiment) according to a given rule on the basis of the entered speed and direction command and the shape information on the present assumed floor. The rule is the same as the rule for determining the predetermined landing positions of the first and second steps. In determining the predetermined landing positions, it is assumed that the current speed and direction command and the present assumed floor are held constant without change.

Setting examples of the predetermined landing positions of the first to Nth steps in the process of step 2 will be described below with reference to FIG. 5, FIG. 6(*a*), FIG. 6(*b*), FIG. 7, FIG. 8(*a*), and FIG. 8(*b*). FIG. 5 is an explanatory diagram illustrating the robot 1 and the actual floor in the sagittal plane (side view) of the robot 1. FIG. 6(*a*) and FIG. 6(*b*) are diagrams of the actual floor and the like shown in FIG. 5 viewed from the above in the vertical direction. FIG. 7 is an explanatory diagram illustrating the robot 1 and the actual floor in the sagittal plane (side view) of the robot 1. FIG. 8(*a*) and FIG. 8(*b*) are diagrams of the actual floor and the like shown in FIG. 7, viewed from the above in the vertical direction. In this instance, FIG. 5 shows an example where the actual floor with which the robot 1 is in contact at the present moment is in a horizontal plane and where the actual floor on the distant side from a position Q1, which is located ahead in the traveling direction of the robot 1, changes from the horizontal plane to an inclined plane (a rising slope in FIG. 5). In addition, FIG. 7 shows an example where the actual floor with which the robot 1 is in contact at the present moment is in an inclined plane (a rising slope in FIG. 7) and where the actual floor on the distant side from a position Q2, which is located ahead in the traveling direction of the robot 1, changes from the inclined plane to a horizontal plane. The "inclined plane" means a floor inclined with respect to the horizontal plane. Moreover, in the description of this embodiment, the both ends of the inclined plane on the traveling path of the robot 1 are referred to as the inclined plane edges in the case where the floor (the actual floor, the present assumed floor, or the estimated floor) in one section on the traveling path of the robot 1 is in an inclined plane having substantially a certain tilt angle (a tilt angle with respect to the horizontal plane) within the section. The inclined plane edges correspond to an inclined change portion in the present invention. Among these inclined plane edges, the inclined plane edge closer to the movement starting point of the robot 1 is referred to as the inclined plane start edge and the other inclined plane edge is referred to as the inclined plane end edge. For example, in the actual floor shown in FIG. 5, the inclined plane start edge is an intersection between the horizontal plane and the inclined plane in the position Q1 where the actual floor changes from the horizontal plane to the inclined plane. Also, in the actual floor shown in FIG. 7, the inclined plane end edge is an intersection between the inclined plane and the horizontal plane in the position Q2 where the actual floor changes from the inclined plane to the horizontal plane.

It is assumed that the present assumed floor is in the horizontal plane (the horizontal plane continuous with the actual floor (horizontal plane) with which the robot 1 is in contact at the present moment) in the case where the actual floor is as shown in FIG. 5. In this situation, for example, as indicated by dashed lines in FIG. 5 and FIG. 6(*a*), the predetermined landing positions of the free legs' feet 17(1) to 17(N) (N=7) are set for the first to Nth steps respectively. In this instance, the step length of each step of the robot 1 is substantially constant. In the description of this embodiment, an index (i) (i=1, 2, - - -, N) denotes the predetermined landing position of the ith step.

Moreover, it is assumed that the present assumed floor substantially matches the actual floor in the case where the actual floor is as shown in FIG. 5. In this situation, for example, as indicated by dashed lines in FIG. 6(*b*), the predetermined landing positions of the free legs' feet 17(1) to 17(N) (N=7) of the robot 1 are set for the first to Nth steps in such a way respectively that any of the free legs' feet 17(1) to 17(N) of the predetermined landing position of each step is not placed on the inclined plane start edge and is not too close to the inclined plane start edge.

Furthermore, it is assumed that the present assumed floor is in the inclined plane (the inclined plane continuous with the actual floor (inclined plane) with which the robot 1 is in contact at the present moment) in the case where the actual floor is as shown in FIG. 7. In this situation, for example, as indicated by dashed lines in FIG. 7 and FIG. 8(*a*), the predetermined landing positions of the free legs' feet 17(1) to 17(N) (N=7) are set for the first to Nth steps respectively. In this instance, the step length of each step of the robot 1 is substantially constant. The step length, however, is smaller than those in FIG. 5 and FIG. 6(*a*) (in the case where the present assumed floor is in the horizontal plane).

Moreover, it is assumed that the present assumed floor substantially matches the actual floor in the case where the actual floor is as shown in FIG. 7. In this situation, for example, as indicated by dashed lines in FIG. 8(*b*), the predetermined landing positions of the free legs' feet 17(1) to 17(N) (N=7) of the robot 1 are set for the first to Nth steps respectively in such a way that any of the free legs' feet 17(1) to 17(N) of the predetermined landing position of each step is not placed on the inclined plane end edge and is not too close to the inclined plane end edge.

As described above, the predetermined landing positions of the steps up to the Nth step are set so as to prevent the free leg's foot 17 from being placed on the inclined plane start edge or inclined plane end edge.

Additionally, while the predetermined landing position of the third step is determined so as to be associated with the gait parameter of the normal gait in this embodiment, the predetermined landing position of the third step may alternatively be determined in the same manner as for determining the predetermined landing positions of the fourth and subsequent steps. Basically, on the assumption that the speed and direction command and the present assumed floor are also held in the present situation in the future, the predetermined landing positions of the steps up to the Nth step only have to be set so as to allow the robot 1 to move stably on the present assumed floor while an average moving speed and a moving direction of the robot 1 of the steps up to the Nth step coincide with the speed and direction command and further geometric constraints on interference between the legs 5, 5 are satisfied.

Until the current free leg's foot 17 of the robot 1 lands, the respective predetermined landing positions of the first to Nth steps set in step 2 are the same in all frames as long as the speed and direction command and the present assumed floor are held constant. On the other hand, in the case where the speed and direction command changes or the present assumed floor is updated before the current free leg's foot 17 lands, the predetermined landing positions set for the first to Nth steps set in step 2 change over time. In addition, after the current free leg's foot 17 lands, at least the Nth predetermined landing position is set anew.

After performing the process of step 2 as described above, the controller 33 subsequently performs the process of step 3. In the process of step 3, the controller 33 sets image projection areas A(i) (i=1, 2, - - -, N) in the vicinity of the predetermined landing positions of the first to Nth steps (N=7) determined in step 2. The image projection areas A(i) are projected on each of the images captured by the cameras 27L and 27R as described later. Also, the image projection areas A(i) are planar areas set on the present assumed floor. The process of step 3 constitutes an image projection area setting means in the present invention.

Figure 9:
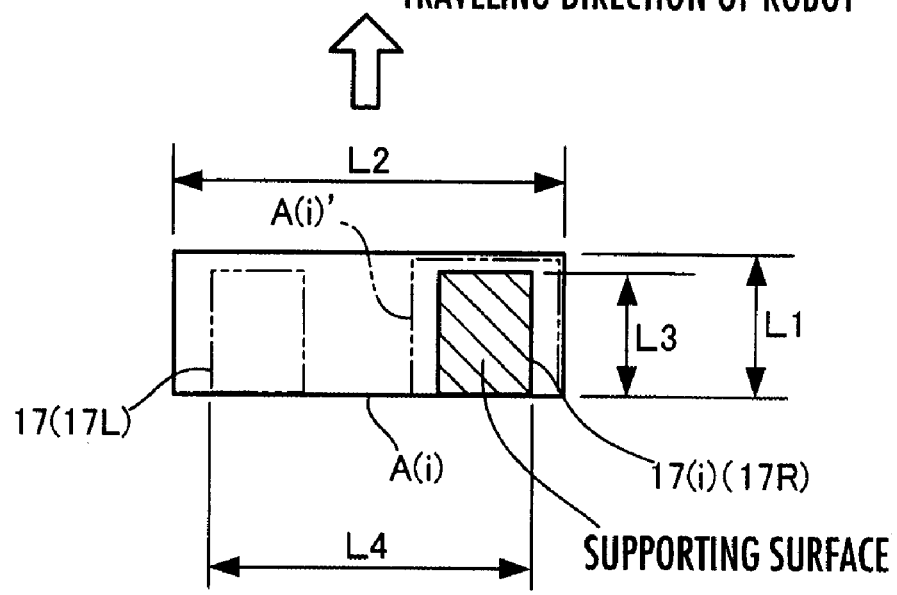
FIG. 9 is a diagram illustrating a relationship between the robot's feet and the image projection area.

Referring to FIG. 9, there is shown a diagram illustrating a setting example of the image projection area A(i). FIG. 9 shows the image projection area A(i) (i=1, 2, - - -, N) viewed in the direction perpendicular to the present assumed floor and the foot 17(*i*) placed on the present assumed floor in the predetermined landing position of the ith step. As shown, the image projection area A(i) is set so as to include the ground surface of the foot 17(*i*) (the right foot 17R in the shown example) in the vicinity of the ground surface in a situation where the entire planar surface of the bottom of the foot 17(*i*) is placed on the present assumed floor in the corresponding predetermined landing position.

More specifically, the image projection area A(i) is set, for example, in a rectangular form in this embodiment. In this instance, a length L1 of the image projection area A(i) in the traveling direction of the robot 1 is slightly larger than a length L3 of the ground surface of the foot 17(*i*) in the traveling direction. Moreover, a length L2 of the image projection area A(i) in the direction perpendicular to the traveling direction of the robot 1 is set to a length that the ground surfaces of the both feet 17, 17 are included in the image projection area A(i) (the length slightly larger than a distance L4 between the left side edge of the left foot 17L and the right side edge of the right foot 17R viewed in the traveling direction of the robot 1), on the assumption that landing state of the foot 17(*i*) on the present assumed floor is maintained while the other foot 17 (the left foot 17L indicated by a two-dot chain line in the example shown in FIG. 9) is placed on the present assumed floor in parallel with the foot 17(*i*) in the horizontal direction.

Although the entire bottom surface of the foot 17 is shown as if it were the ground surface (planar surface) for illustration purpose in the example shown in FIG. 9, the entire bottom surface of the foot 17 does not need to be the planar surface. For example, the front end and the rear end of the bottom surface of the foot 17 may be upwardly curved while the remaining part other than the front end and the rear end of the bottom surface is planar. Alternatively, a plurality of flush planar surfaces can be formed in the bottom surface of the foot 17. In these cases, the ground surface of the foot 17 is a part of the bottom surface of the foot 17. If it is the case, then the image projection area of the ith step may be set so that an area other than the ground surface of the foot 17(*i*) of the area generated by projecting the entire foot 17(*i*) on the present assumed floor protrudes from the image projection area.

In addition, the image projection area A(i) does not always have to be set in a rectangular form. Moreover, for example, as shown by A(i)' indicated by a virtual line in FIG. 9, it is also possible to set an area that includes the ground surface of the foot 17(*i*) and has dimensions slightly larger than those of the ground surface (an area including only the ground surface of one foot 17(*i*)) as the image projection area of the ith step.

If the present assumed floor is in the horizontal plane, for example, in the situation shown in FIG. 5 when the image projection area A(i) is set as described above, the image projection areas A(1) to A(N) of the first to Nth steps (N=7) are set as shown in FIG. 5 and FIG. 6(a). Moreover, if the present assumed floor substantially matches the actual floor in FIG. 5, the image projection areas A(1) to A(N) of the first to Nth steps are set as shown in FIG. 6(b).

On the other hand, if the present assumed floor is in the inclined plane, for example, in the situation shown in FIG. 7, the image projection areas A(1) to A(N) of the first to Nth steps (N=7) are set as shown in FIG. 7 and FIG. 8(a). Moreover, if the present assumed floor substantially matches the actual floor in FIG. 7, the image projection areas A(1) to A(N) of the first to Nth steps are set as shown in FIG. 8(b).

Subsequently, the controller 33 performs the process of step 4. In the process of step 4, the controller 33 projects the image projection areas A(i) (i=1, 2, - - -, N) set in step 3 on the images captured by the cameras 27L and 27R. In this instance, in order to project each image projection area A(i) on the image captured by each camera 27, the controller 33 recognizes the position and posture of the camera 27L or 27R in the global coordinate system or the position and posture of the image projection area A(i) on the coordinate system fixed with respect to the camera 27L or 27R on the basis of the current position of the robot 1 in the global coordinate system and the displacement (detected value or desired value) of each joint of the robot 1. The "posture" means a spatial orientation.

Figure 10:
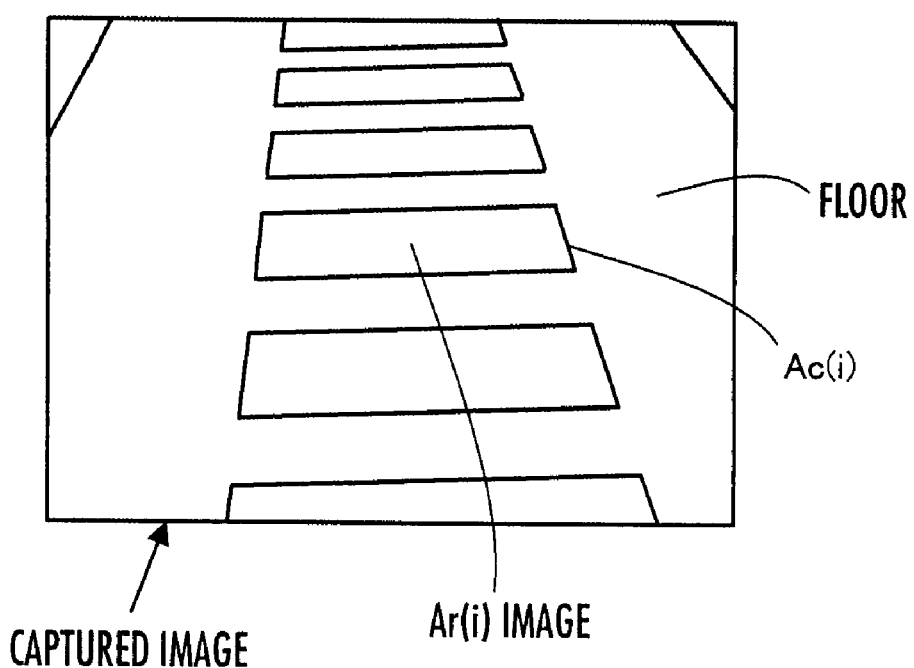
FIG. 10 is a diagram illustrating a state in which the image projection area is projected on a captured image.

The process of step 4 allows each captured image to include a partial image area Ac(i) generated by projecting each image projection area A(i) on the captured image, for example, as illustrated in FIG. 10. Note that the image in FIG. 10 is captured by the right camera 27R.

The image in each partial image area Ac(i) is the image of a partial area of the actual floor existing ahead in the traveling direction of the robot 1. Hereinafter, the partial area of the actual floor, which is captured as an image within each partial image area Ac(i), is referred to as the actual floor partial area Ar(i).

Additionally, if the present assumed floor in the image projection area A(i) matches the actual floor, the actual floor partial area Ar(i) corresponding to the image projection area A(i) matches the image projection area A(i). On the other hand, unless the present assumed floor in the image projection area A(i) matches the actual floor, the image in the partial image area Ac(i) corresponding to the image projection area A(i), namely the image of the actual floor partial area Ar(i) is an image of a partial area of the actual floor that is located on a straight line connecting each point in the image projection area A(i) and the optical center of each camera 27. For example, if the present assumed floor is in the horizontal plane in the situation shown in FIG. 5, actual floor partial areas Ar(6) and Ar(7) corresponding to the image projection areas A(6) and A(7) of the sixth and seventh steps, respectively, are partial areas in the inclined plane of the actual floor as shown in FIG. 5. Then, the images of the actual floor partial areas Ar(6) and Ar(7) are the images within the partial image areas Ac(6) and Ac(7), respectively. Similarly, if the present assumed floor is in the inclined plane in the situation shown in FIG. 7, actual floor partial areas Ar(6) and Ar(7) corresponding to the image projection areas A(6) and A(7) of the sixth and seventh steps, respectively, are partial areas in the horizontal plane of the actual floor as shown in FIG. 7.

Note that, however, the actual captured image by each camera 27 does not always include the partial image areas Ac(i) corresponding to all the image projection areas A(i) of the first to Nth steps (N=7).

Subsequently, the controller 33 performs the process of step 5. The process is to estimate shape parameters representing the shape of an actual floor captured within the partial image area Ac(i) corresponding to each image projection area A(i), namely the actual floor partial area Ar(i). The process of step 5 constitutes a floor shape estimation means in the present invention.

The outline of the estimation process will be described below. In this embodiment, assuming that the actual floor partial area Ar(i) corresponding to each image projection area A(i) is an area included in one plane, a pair consisting of a floor posture parameter that represents the spatial (three-dimensional) posture of the actual floor partial area Ar(i) and a floor position parameter that represents the spatial position of the actual floor partial area Ar(i) in the normal line direction of the actual floor partial area Ar(i) is used as the shape parameters of the actual floor partial area Ar(i).

In general, an arbitrary plane in a space is uniquely identified from its normal line direction and from the position of the plane in its normal line direction. Therefore, in this embodiment, a normal vector (unit vector) n(i) of the plane including the actual floor partial area Ar(i) is used as the floor posture parameter of the actual floor partial area Ar(i). Moreover, a distance d(i) between a representative point of the robot 1 and the plane including the actual floor partial area Ar(i) (hereinafter, referred to as the plane distance d(i)) is used as the floor position parameter in this embodiment. In this instance, for example, the optical center of the standard camera 27L among the cameras 27R and 27L is used as the representative point of the robot 1 regarding the plane distance d(i).

Therefore, the process of step 5 is to estimate the pair consisting of the planar normal vector n(i) that includes the actual floor partial area Ar(i) and the plane distance d(i) (n(i), d(i)) as the shape parameters of the actual floor partial area Ar(i) for each actual floor partial area Ar(i). In this embodiment, the normal vector n(i) estimated in step 5 is described as a pair of the coordinate axis components in the three-dimensional coordinate system fixed with respect to, for example, the camera 27L or 27R (hereinafter, referred to as the camera coordinate system) in each frame. The camera coordinate system is, for example, a three-dimensional orthogonal coordinate system with the origin as the optical center of the standard camera 27L. In this instance, the plane distance d(i) is from the origin of the camera coordinate system to the plane including the actual floor partial area Ar(i).

FIG. 5 and FIG. 7 each show an example of the shape parameters defined as described above. References n(2) and d(2) in FIG. 5 denote a normal vector n(2) and a plane distance d(2) as shape parameters of an actual floor partial area Ar(2) corresponding to an image projection area A(2) of the second step (in the shown example, Ar(2) substantially matches A(2)), respectively. Similarly, references n(6) and d(6) in FIG. 5 denote a normal vector n(6) and a plane distance d(6) as shape parameters of an actual floor partial area Ar(6) corresponding to an image projection area A(6) of the sixth step, respectively. Furthermore, references n(3) and d(3) in FIG. 7 denote a normal vector n(3) and a plane distance d(3) as shape parameters of an actual floor partial area Ar(3) corresponding to an image projection area A(3) of the third step (in the shown example, Ar(3) substantially matches A(3)), respectively. Similarly, references n(6) and d(6) in FIG. 7 denote a normal vector n(6) and a plane distance d(6) as shape parameters of an actual floor partial area Ar(6) corresponding to an image projection area A(6) of the sixth step, respectively.

Furthermore, in the process of step 5, the shape parameters (n(i), d(i)) of each actual floor partial area Ar(i) are estimated by a convergence calculation using projective transformation between the images captured by the cameras 27L and 27R. In the convergence calculation, a comparison is made between an image, which is generated by transforming an image in the partial image area Ac(i) of the reference image (the image captured by the camera 27R) using a projective transformation matrix which is determined according to the values of the shape parameters (n(i), d(i)), and the image in the partial image area Ac(i) of the reference image (the image captured by the camera 27L), and in parallel with the comparison the values of (n(i), d(i)) are gradually updated from certain initial values so that these images substantially match. In other words, (n(i), d(i)) are assumed to be variable parameters, and the values of the variable parameters are updated from the certain initial values so that the plane defined by the variable parameter values is converged to a plane including the actual floor partial area Ar(i) (consequently, the projective transformation matrix determined by the variable parameter values is updated). The final convergence values of the variable parameters by the convergence calculation are obtained as estimated values of the shape parameters (n(i), d(i)) of the actual floor partial area Ar(i). The projective transformation matrix determined by the convergence values of the variable parameters has a meaning of the projective transformation matrix capable of converging the image in the partial image area Ac(i) of the reference image to an image that matches the image in the partial image area Ac(i) of the standard image.

Figure 4:
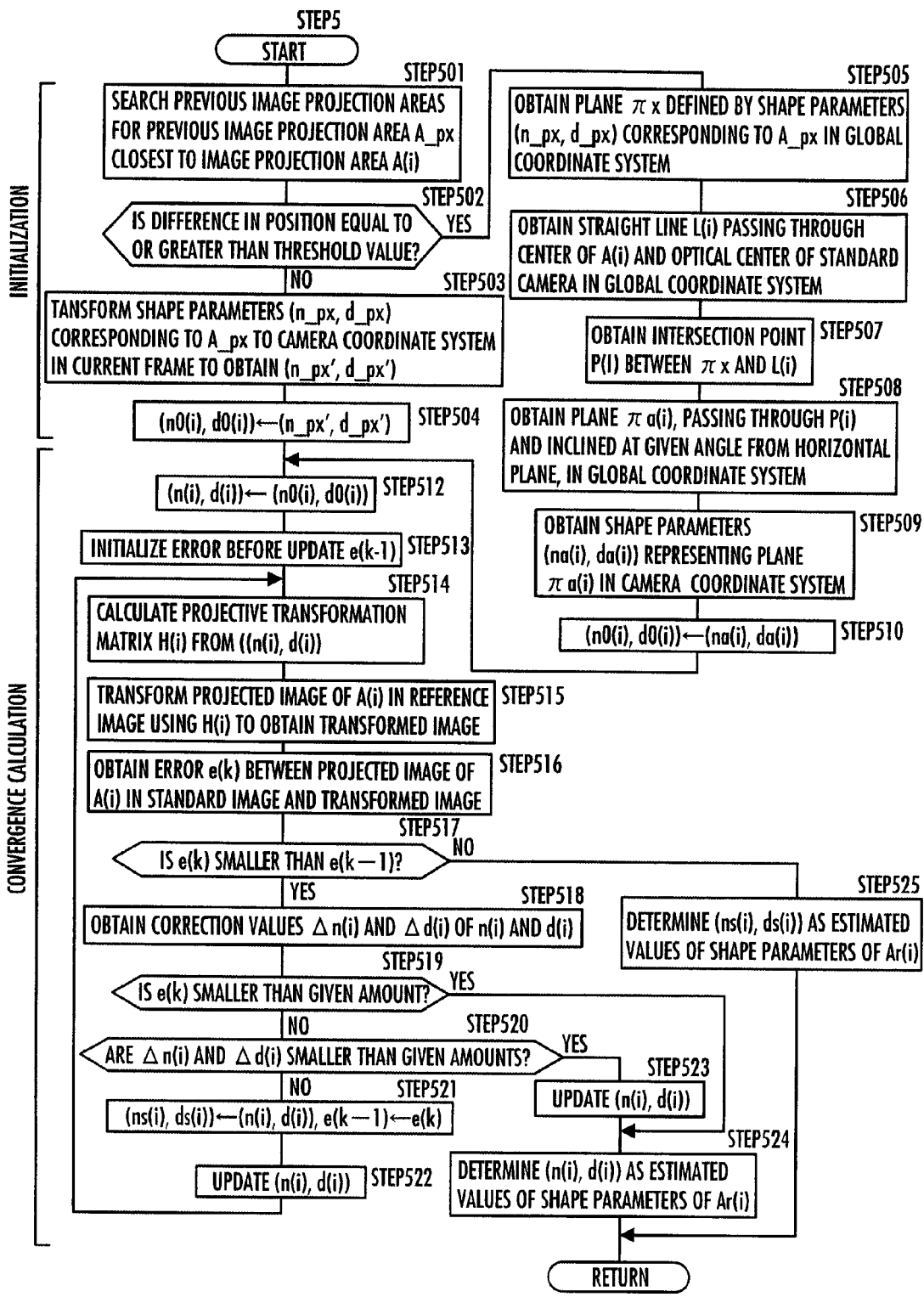
FIG. 4 is a flowchart illustrating the details of a process in step 5 shown in FIG. 3.

FIG. 4 is a flowchart showing the details of the process of step 5. This process is performed for each image projection area A(i) set in step 3. Hereinafter, in the description of the process of step 5, a reference character i indicating the order of the step of the predetermined landing position is used as one denoting a single arbitrary value among 1 to N (N=7). Furthermore, the image projection areas A(1) to A(N) set in the previous frame are referred to as previous image projection areas A_p(1) to A_p(N). The suffix "_p" is used to mean that the area relates to the previous frame.

In the process of step 5, the controller 33, first in step 501, searches N previous image projection areas, A_p(1) to A_p(N), for the previous image projection area A_px (A_px is one of A_p(1) to A_p(N)) that is closest to the image projection area A(i) corresponding to the predetermined landing position of the ith step in the current frame. Note that the term "closest to" means "closest in spatial position." More specifically, the controller 33 calculates a distance between the center of the image projection area A(i) and the center of each of N previous image projection areas, A_p(1) to A_p(N), on the basis of the positions in the global coordinate system of the centers and then considers one previous image projection area having the minimum distance as the previous image projection area A_px closest to the image projection area A(i). Hereinafter, the previous image projection area A_px is referred to as the close previous image projection area Ap_x.

Next, in step 502, the controller 33 determines whether a difference in position between the image projection area A(i) and the close previous image projection area Ap_x is equal to or greater than a given threshold value. The difference in position between the image projection area A(i) and the close previous image projection area Ap_x corresponds to a distance between the center of the image projection area A(i) and the center of the close previous image projection area Ap_x calculated in step 501. If the determination result is NO, the controller 33 performs the process of steps 503 and 504. If the determination result is YES, it performs the process of steps 505 to 510.

Additionally, the process of steps 501 to 510 is performed to set the initial values of (n(i), d(i)) in the convergence calculation described later.

The situation where the determination result of step 502 is NO means that the image projection area A(i) partially overlaps the close previous image projection area A_px and it is predicted that the plane including the actual floor partial area Ar(i) corresponding to the image projection area A(i) coincides or substantially coincides with the plane including the actual floor partial area Ar_px corresponding to the close previous image projection area A_px with high accuracy. On the other hand, the situation where the determination result of step 502 is YES means that the image projection area A(i) does not overlap the close previous image projection area A_px (in other words, it has no relevance to the actual floor partial area Ar_px whose shape parameters have already been estimated in the previous frame) and it is difficult to predict the spatial posture and position of the plane including the actual floor partial area Ar(i) corresponding to the image projection area A(i) with high accuracy at the present moment. The situation where the determination result of step 502 is YES occurs in the case of setting of an image projection area corresponding to the predetermined landing position of a new step in the current frame (the step subsequent to the Nth step in the previous frame) or in the case of updating the present assumed floor ahead in the traveling direction of the robot 1 between the previous frame and the current frame.

In the process of steps 503 and 504 performed when the determination result of step 502 is NO, initial values (n0($i$), d0($i$)) are set to estimate the shape parameters (n(i), d(i)) of the actual floor partial area Ar(i) corresponding to the image projection area A(i) by the convergence calculation. More specifically, in step 503, the controller 33 transforms the shape parameters (n_px, d_px) estimated in the previous frame (the shape parameters are described in the camera coordinate system in the previous frame) to the camera coordinate system in the current frame in correspondence with the close previous image projection area Ap_x and defines the transformed shape parameters as (n_px', d_px'). The relationship between the camera coordinate system in the previous frame and the camera coordinate system in the current frame is recognized on the basis of the displacements of the respective joints of the robot 1 in the period between the previous frame and the current frame.

Next, in step 504, the controller 33 sets the shape parameters (n_px', d_px') obtained as described above as initial values (n0($i$), d0($i$)) of the shape parameters (n(i), d(i)) of the actual floor partial area Ar(i). Setting the initial values (n0($i$), d0($i$)) in this manner means that the initial values of the plane including the actual floor partial area Ar(i) are matched with the plane including the actual floor partial area Ar_px corresponding to the close previous image projection area A_px.

On the other hand, the initial values (n0($i$), d0($i$)) of (n(i), d(i)) are set as described below in the process of steps 505 to 510 if the determination result of step 502 is YES. In other words, in step 505, the controller 33 obtains a plane πx defined by the shape parameters (n_px, d_px) estimated in the previous frame so as to be associated with the close previous image projection area Ap_x in the global coordinate system (obtains the position and posture of the plane πx in the global coordinate system). More specifically, for example, the controller 33 transforms the shape parameters (n_px, d_px) described in the camera coordinate system in the previous frame to the camera coordinate system in the current frame by the same process of step 503. It then describes the plane πx in the global coordinate system on the basis of the shape parameters (n_px', d_px') after the transformation and the relationship between the camera coordinate system and the global coordinate system in the current frame. Alternatively, the controller 33 describes the plane πx in the global coordinate system on the basis of the shape parameters (n_px, d_px) described in the camera coordinate system in the previous frame and the relationship between the camera coordinate system and the global coordinate system in the previous frame. The relationship between the camera coordinate system and the global coordinate system in each frame can be recognized on the basis of the position in the global coordinate system of the robot 1 in each frame and the displacement of each joint of the robot 1 in the frame.

Next, in step 506, the controller 33 obtains a straight line L(i), which passes through the center of the image projection area A(i) and the optical center of the standard camera 27L, in the global coordinate system. In other words, the straight line L(i) is described in the global coordinate system.

Next, in step 507, the controller 33 obtains an intersection point P(i) between the plane πx and the straight line L(i). In other words, it obtains the position of intersection point P(i) in the global coordinate system. Alternatively, for example, it is possible to obtain the position of the intersection point P(i) in the camera coordinate system in the current frame and then transform it to the global coordinate system.

Subsequently, the controller 33 proceeds to step 508 to obtain a plane πpa(i), which passes through the intersection point P(i) obtained as described above and is inclined at a given angle θ from the horizontal plane, in the global coordinate system. The predetermined angle θ is, for example, 45° in this embodiment. In this case, there are countless planes, which pass through the intersection point P(i) and are inclined at the given angle θ, and any of the planes can be obtained as πpa(i). By way of example, the controller 33 obtains a plane as πpa(i) that passes through the intersection point P(i), includes a horizontal straight line parallel to the Y-axis direction of the global coordinate system or to the right/left direction of the robot 1, and is inclined at the predetermined angle θ from the horizontal plane (a plane forming a rising slope or falling slope, viewed from the robot 1) in this embodiment. Note that the point P(i) through which the plane πpa(i) passes (existing on the plane πpa(i)) does not always have to be set as described above, but for example, an arbitrary point in the image projection area A(i) may be set as P(i). Moreover, for example, d_px' of (n_px', d_px'), which is obtained by transforming the shape parameters (n_px, d_px) estimated in the previous frame so as to be associated with the close previous image projection area Ap_x to the camera coordinate system in the current frame, may be set to d0(i) that is the same value as the initial value. In this case, there is no need to determine the point P(i) through which the plane πpa(i) passes.

Subsequently, the controller 33 proceeds to step S509 to obtain the shape parameters (na(i), da(i)) representing the plane πpa(i) in the camera coordinate system in the current frame. The shape parameter na(i) is a normal vector (unit vector) in the camera coordinate system of πpa(i), and the shape parameter da(i) is a distance between the optical center of the standard camera 27L and the plane πpa(i) in the current frame.

Subsequently, the controller 33 proceeds to step 510 to set (na(i), da(i)) as the initial values (n0(i), d0(i)) of the shape parameters (n(i), d(i)) of the actual floor partial area Ar(i).

If the determination result of step 502 is YES, in other words, if it is difficult in that situation to predict the spatial posture and position of the plane including the actual floor partial area Ar(i) corresponding to the image projection area A(i) at present with high accuracy, the initial values (n0(i), d0(i)) of the shape parameters (n(i), d(i)) are set so that the plane defined by the shape parameters is inclined at a given angle θ to the horizontal plane.

Figure 11:
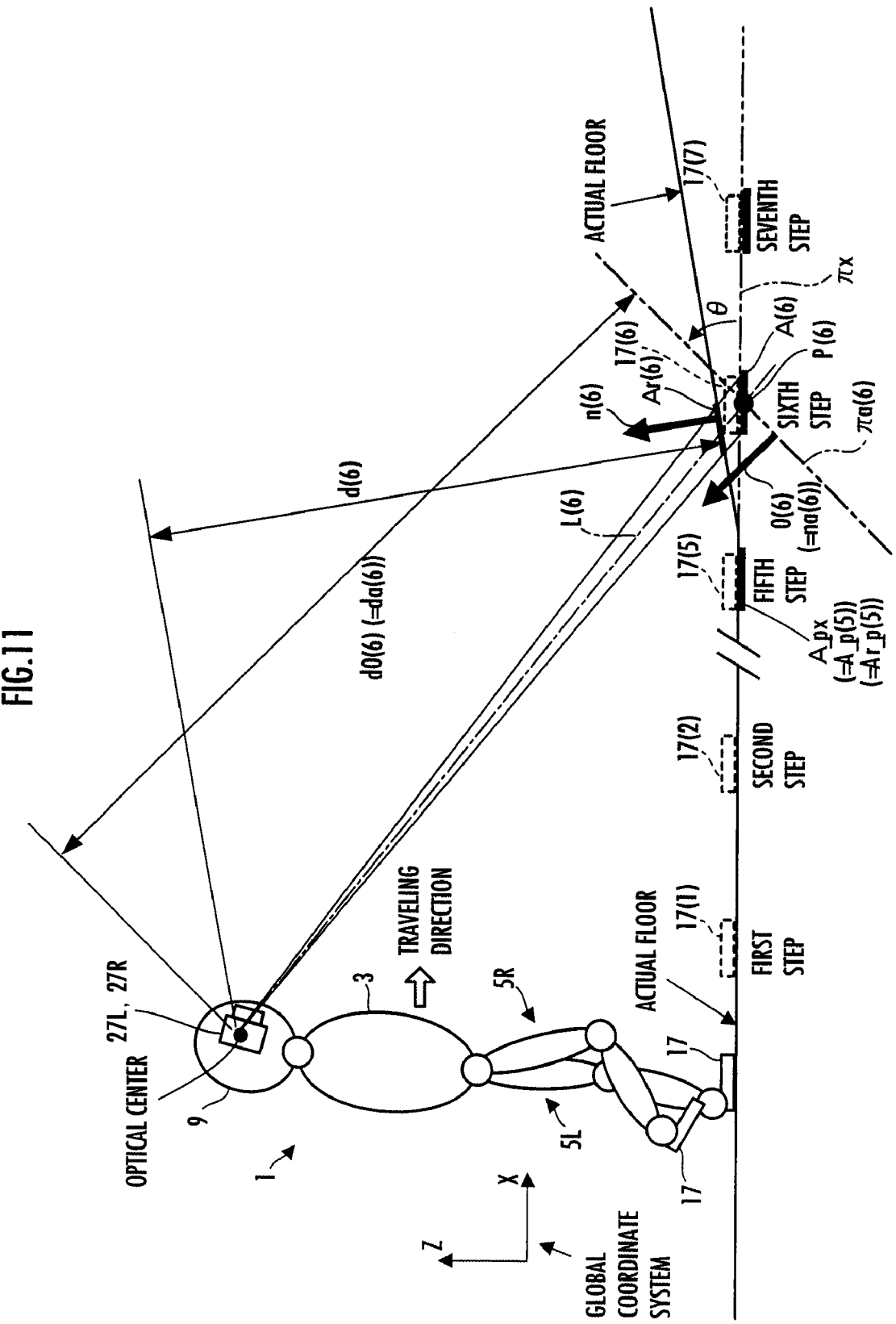
FIG. 11 is a diagram for explaining a setting example of initial values of shape parameters in a convergence calculation for estimating the shape parameters of an actual floor partial area.

A setting example of the initial values (n0(i), d0(i)) in the above will be described with reference to FIG. 11. FIG. 11 shows an explanatory diagram therefor, in which the robot 1 and the actual floor are shown in the sagittal plane (side view). In this instance, it is assumed that the close previous image projection area A_px that is closest to the image projection area A(6) of the sixth step in the current frame is the image projection area A_p(5) of the fifth step in the previous frame. Moreover, in this example, it is assumed that the actual floor in the vicinity of the predetermined landing position of the fifth step in the previous frame substantially coincides with the present assumed floor and consequently that the actual floor partial area Ar_p(5) corresponding to the close previous image projection area A_px (=A_p(5)) substantially coincides with the close previous image projection area A_px.

In this case, the plane πx shown in FIG. 11 (the plane including the actual floor partial area Ar_p(5)) is obtained in step 505 regarding the image projection area A(5) of the sixth step in the current frame. Thereafter, a straight line L(6) shown in FIG. 11 is determined in step 506. Furthermore, a point P(6) in FIG. 11 is determined in step 507. In this example, the point P(6) coincides with the center of the image projection area A(6) of the sixth step. Then, a plane pa(6) shown in FIG. 11 is determined in step 508. The plane pa(6) passes through the point P(6) and is inclined at the given angle θ (for example, 45°) to the horizontal plane. Furthermore, in step 509, the controller 33 obtains the shape parameters (na(6), da(6)) representing the plane pa(6), namely a pair consisting of the normal vector na(6) of the plane pa(6) and the plane distance da(6) from the optical center of the standard camera 27L to the plane pa(6) in the current frame. Then, the shape parameters (na(6), da(6)) are set as the initial values (n0(6), d0(6)) of the shape parameters (n(6), d(6)) of the actual floor partial area Ar(6) corresponding to the image projection area A(6) of the sixth step.

It will be described later why the initial values (n0(i), d0(i)) of the shape parameters (n(i), d(i)) are set as described above if the determination result is YES in step 502.

The process of steps 501 to 510 described hereinabove is performed to set the initial values (n0(i), d0(i)) of the shape parameters (n(i), d(i)).

After setting the initial values (n0(i), d0(i)) as described above, the controller 33 proceeds to step 512 to set the initial values (n0(i), d0(i)) as temporary values of the shape parameters (n(i), d(i)) of the actual floor partial area Ar(i). The process from step 512 corresponds to the convergence calculation for estimating the shape parameters (n(i), d(i)). In this embodiment, the convergence calculation of the Gauss-Newton method is employed as this convergence calculation.

Subsequently, the controller 33 proceeds to step 513 to initialize an error before update e(k−1). The error before update e(k−1) initialized here is for use in comparison with an error e(k), which is obtained in the first process of step 516 in a loop process described later, and is set to an excessive error that is surely greater than the error e(k).

Subsequently, the controller 33 performs the loop process for repeating the process of step 514 to step 522 until a required condition is satisfied. In this loop process, the shape parameters (n(i), d(i)) represent variable parameters and their values are updated appropriately. Hereinafter, the process of steps 514 to 522 in each round of the loop process is referred to as the in-loop calculation; the currently running in-loop calculation is referred to as the current in-loop calculation; and the immediately preceding in-loop calculation is referred to as the previous in-loop calculation. Moreover, in order to distinguish a value obtained by the current in-loop calculation from a value obtained by the previous in-loop calculation, (k)

is appended to the former value and (k−1) is appended to the latter value, if necessary. Note that (n(i), d(i)) are referred to as the variable parameters (n(i), d(i)) until the values are determined.

In step 514, the controller 33 calculates a projective transformation matrix H(i) between the cameras 27L and 27R from the current values of the variable parameters (n(i), d(i)). The projective transformation matrix H(i) is given by equation (1) described below. Note that H(i) is represented in the normalized camera coordinate system.

$$H(i) = R + t \cdot m(i)T \quad (1)$$

where $m(i) = n(i)/d(i)$.

In the above, R is a rotation matrix between the cameras 27L and 27R and t is a translation vector (here, a column vector) between the respective optical centers of the cameras 27L and 27R. They depend on the internal parameters such as the relative position and posture relationship between the cameras 27L and 27R and are previously determined by a calibration. Additionally, m(i) is a vector (here, a column vector) obtained by dividing the normal vector n(i) by a plane distance d(i) as defined by the provision of equation (1). A reference character "T" in equation (1) means a transposition.

As apparent from equation (1), the projective transformation matrix H(i) is defined by the values of the variable parameters (n(i), d(i)).

Subsequently, the controller 33 proceeds to step S515 to transform the projected image of the image projection area A(i) in the reference image (the image captured by the camera 27R) of the images captured by the cameras 27L and 27R, namely the image in the partial image area Ac(i) in the reference image by using the projective transformation matrix H(i) and to obtain the image generated by the transformation as a transformed image.

Subsequently, the controller 33 proceeds to step 516 to obtain an error e(k) between the projected image of the image projection area A(i) in the standard image (the image captured by the camera 27L), namely the image in the partial image area Ac(i) in the standard image and the transformed image obtained in step 515. The error e(k) is an amount that depends on a difference in luminance distribution or a difference in shape between the image in the partial image area Ac(i) in the standard image and the transformed image obtained in step 515.

If the plane defined by the current values of the variable parameters ((n(i), d(i)) coincides with the plane including the actual floor partial area Ar(i) with high accuracy, the transformed image obtained in step 515 matches or substantially matches the image in the partial image area Ac(i) in the standard image. In this case, the error e(k) becomes zero or very small. Therefore, the error e(k) is an index representing a degree of difference between the plane defined by the current values of the variable parameters (n(i), d(i)) (in other words, the plane defined by the projective transformation matrix H(i) determined by the current values of the variable parameters (n(i), d(i))) and the plane including the actual floor partial area Ar(i). In other words, the error e(k) is an index representing the error in current values of the variable parameters (n(i), d(i)) to the true values.

Then, the controller 33 proceeds to step 517 to determine whether the current error e(k) is smaller than the error before update e(k−1), which is the error obtained in step 516 in the previous in-loop calculation. If the current in-loop calculation is the first-round in-loop calculation, the error before update e(k−1) to be compared with the error e(k) is a value initialized in step 513 described above. Therefore, in this case, the determination result of step 517 is always YES.

Additionally, if the current in-loop calculation is the first-round in-loop calculation, it is also possible to omit the determination of step 517 and to perform the process from step 518. In that case, the process of step 513 is unnecessary.

If the determination result of step 517 is YES, the controller 33 proceeds to step 518 to obtain respective correction values Δn(i) and Δd(i) of n(i) and d(i). These correction values Δn(i) and Δd(i) are determined according to the error e(k) and the like.

Subsequently, the controller 33 proceeds to step 519 to determine whether the current error e(k) is smaller than a given amount, in other words, whether the error e(k) is sufficiently small.

If the determination result is NO, the controller 33 proceeds to step 520 to determine whether the correction values Δn(i) and Δd(i) obtained in step 518 are smaller than given amounts, respectively.

If the determination result is NO, the controller 33 proceeds to step 521 to set (store) and hold the current values of the variable parameters (n(i), d(i)) as the values of (ns(i), ds(i)) and to substitute the current error e(k) for the error before update e(k−1) (set the current error e(k) as the error before update of the next in-loop calculation).

Furthermore, the controller 33 proceeds to step 522 to update the current values of the variable parameters (n(i), d(i)) using the correction values Δn(i) and Δd(i) obtained in step 518. Thereby, the current in-loop calculation ends. Then, the controller 33 restarts the in-loop calculation from step 514.

On the other hand, if the determination result of step 517 is NO, the determination result of step 519 is YES, or the determination result of step 520 is YES, the in-loop calculation ends (exits from the loop processing of steps 514 to 522) and the estimated values of the shape parameters (n(i), d(i)) of the actual floor partial area Ar(i) are determined. In other words, the controller 33 determines the values of the variable parameters (n(i), d(i)) which define the projective transformation matrix H(i) that allows a transformed image generated by transforming the image of the actual floor partial area Ar(i) in the reference image (the image in the partial image area Ac(i)) using the projective transformation matrix H(i) to coincide with the image of the actual floor partial area Ar(i) in the standard image (the image in the partial image area Ac(i)).

More specifically, the variable parameters (n(i), d(i)) are substantially converged to certain values in the situation where the determination result of step 520 in the current in-loop calculation is YES, and therefore in this situation, it is thought that the values of (n(i), d(i)) will not change almost at all even if the update of the values of (n(i), d(i)) is further repeated. In this case, the controller 33 proceeds to step 523 to update the current values of the variable parameters (n(i), d(i)) using the correction values Δn(i) and Δd(i) obtained in step 518 of the current in-loop calculation. Thereafter, in step 524, the controller 33 determines the values of the variable parameters (n(i), d(i)) obtained after the update as the estimated values of the shape parameters (n(i), d(i)) of the actual floor partial area Ar(i). In this case, alternatively it is possible to omit the process of step 523 and to use the values of the variable parameters (n(i), d(i)) used in step 514 of the current in-loop calculation directly as the estimated values of the shape parameters (n(i), d(i)) of the actual floor partial area Ar(i).

Moreover, in the situation where the determination result of step 519 in the current in-loop calculation is YES, it is thought that the plane defined by the variable parameters (n(i), d(i)) used in step 514 in the current in-loop calculation sufficiently matches the plane including the actual floor partial area Ar(i). If this is the case, the controller 33 proceeds to step 524 to determine the current values of the variable parameters (n(i), d(i)), namely (n(i), d(i)) used in step 514 of the current in-loop calculation as the estimated values of the shape parameters (n(i), d(i)) of the actual floor partial area Ar(i).

If the determination result of step 517 in the current in-loop calculation is NO, the variable parameters (n(i), d(i)) possibly diverge even if the in-loop calculation is further repeated. Therefore, in this case, the controller 33 proceeds to step 525 to determine the values of (ns(i), ds(i)) set in step 521 in the previous in-loop calculation, namely variable parameters (n(i), d(i)) used in step 514 in the previous in-loop calculation as the estimated values of the shape parameters (n(i), d(i)) of the actual floor partial area Ar(i).

The above is the details of the process of step 5. The process of step 5 allows the acquisition of the estimated values of the shape parameters (n(i), d(i)) of the actual floor, which is regarded as an image in the partial image area Ac(i) corresponding to each image projection area A(i), namely the actual floor partial area Ar(i).

Then, the following describes the reason why the plane πpa(i) corresponding to the initial values (n0(i), d0(i)) of (n(i), d(i)) is set as described above in the case where the determination result of step 502 is YES.

The present inventor performed an experiment as described below. Specifically, the inventor performed the convergence calculation of steps 512 to 524 with the value of d0(i) set to a plurality of values for a case where n0(i) of the initial values ((n0(i), d0(i)) is matched with the actual normal vector n(i) of the actual floor partial area Ar(i) for the actual floor partial area Ar(i) (the area in a certain position ahead of the robot 1) whose shape parameters (n(i), d(i)) are known (a case where the plane πpa(i) is in parallel with the plane of the actual floor partial area Ar(i) of the plane πpa(i)) and for a case where n0(i) is inclined with respect to the actual normal vector n(i) of the actual floor partial area Ar(i) (a case where the plane πpa(i) is inclined with respect to the plane of the actual floor partial area Ar(i)). Then, the inventor measured the number of executions of the in-loop calculation until the completion of the convergence calculation for each case.

Figure 12A:
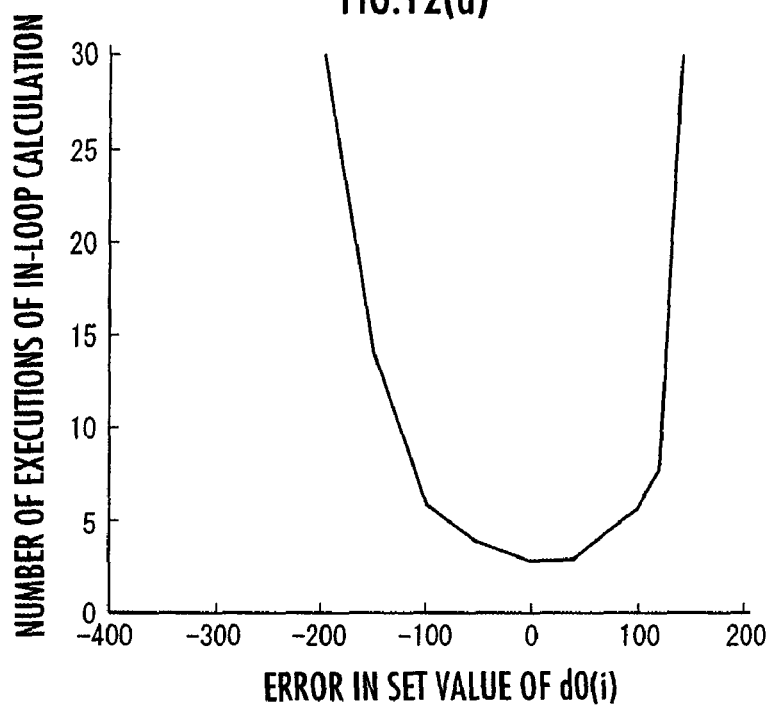
FIG. 12(a) and FIG. 12(b) are graphs for explaining a setting approach for the initial values of the shape parameters in the convergence calculation for estimating the shape parameters of the actual floor partial area.
Figure 12B:
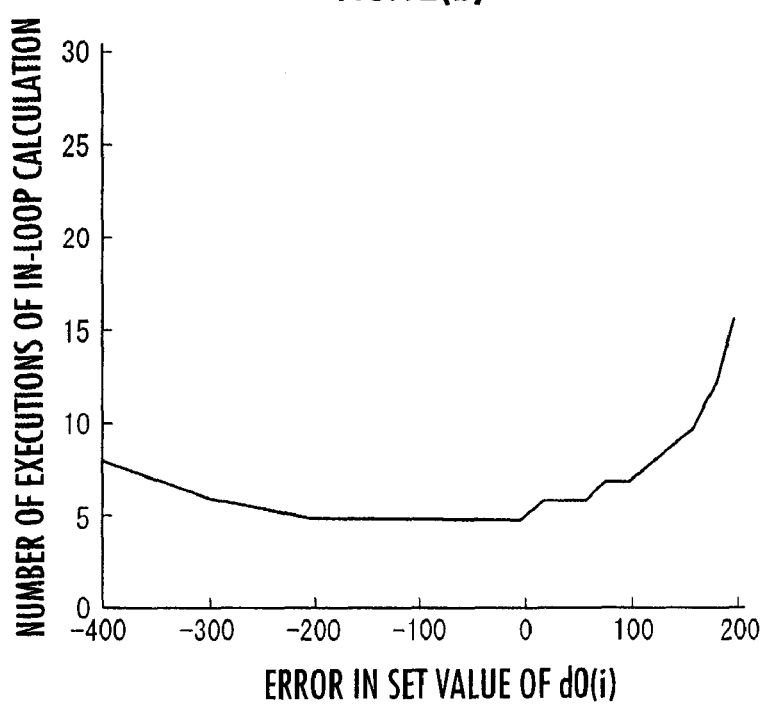

The examples of the measurement result are shown in FIG. 12(a) and FIG. 12(b). FIG. 12(a) is a graph illustrating a relationship between an error in set value of d0(i) (an actual error of d(i)) and the number of executions of the in-loop calculation in the case where the plane πpa(i) corresponding to the initial values (n0(i), d0(i)) are in parallel with the plane of the actual floor partial area Ar(i), and FIG. 12(b) is a graph illustrating a relationship between an error in set value of d0(i) (an actual error of d(i)) and the number of executions of the in-loop calculation in the case where the plane πpa(i) corresponding to the initial values (n0(i), d0(i)) are inclined 45° to the actual floor partial area Ar(i). In these examples, the actual floor partial area Ar(i) is in the horizontal plane. In either diagram, the abscissa axis represents the error in set value of d0(i) and the ordinate axis represents the number of executions of the in-loop calculation.

As shown in FIG. 12(a), in the case where the plane πpa(i) is in parallel with the plane of the actual floor partial area Ar(i), the number of executions of the in-loop calculation rapidly increases with increasing error in set value of d0(i). Moreover, if the error in set value of d0(i) increases to some extent, the variable parameters (n(i), d(i)) cannot be converged to certain values. On the other hand, as shown in FIG. 12(b), in the case where the plane πpa(i) is inclined with respect to the plane of the actual floor partial area Ar(i), the number of executions of the in-loop calculation does not increase so much even if the error in set value of d0(i) increases and it is possible to converge the variable parameters (n(i), d(i)) to certain values. From the above result, in order to estimate the actual variable parameters (n(i), d(i)) efficiently with the smallest possible number of executions of the in-loop calculation, it is desirable to incline the plane πpa(i) corresponding to the initial values (n0(i), d0(i)) with respect to the plane of the actual floor partial area Ar(i). In addition, if that is performed, the set value of d0(i) does not need to be a value sufficiently close to the actual value of d(i), but can be a relatively rough value.

On the other hand, in a legged locomotion robot like the robot 1 in this embodiment, generally the tilt angle (the tilt angle with respect to the horizontal plane) of the floor where the robot is to be moved is limited to a tilt angle within a certain allowable range by the mechanical constraints such as the joints of the robot or the constraints of the specifications. In addition, if the operating environment of the robot is limited to a predetermined environment, the range of the tilt angle of the floor in the environment is previously determined. A value that can be employed for the tilt angle of the floor where the robot is to be moved is a value within a certain range and the range is known in general. Moreover, the tilt angle of the floor where the robot is to be moved is generally on the order of 10° at most.

Therefore, it is practically possible to always incline the plane πpa(i) corresponding to the initial values (n0(i), d0(i)) with respect to the plane of the actual floor partial area Ar(i) by inclining the plane πpa(i) at an angle deviating from the range of the values that can be employed for the tilt angle of the floor where the robot is to be moved. For example, it is practically possible to always incline the plane πpa(i) with respect to the plane of the actual floor partial area Ar(i) by inclining the plane πpa(i) 45° with respect to the horizontal plane.

From the above considerations, if the determination result of step 502 is YES, it is determined that the initial values (n0(i), d0(i)) should satisfy a limiting condition that the plane πpa(i) corresponding to the initial values (n0(i), d0(i)) is inclined with respect to the plane of the actual floor partial area Ar(i) and that the plane πpa(i) is inclined at a given angle θ with respect to the horizontal plane so as to satisfy the limiting condition in this embodiment. Then, 45° is employed as an example of the given angle θ.

Although θ only has to deviate from the range of values allowed for the floor tilt angle as described above, it is more desirable that the absolute value of an angular difference from an arbitrary tilt angle within the range is equal to or higher than a given value. Since θ is 45° in this embodiment, the difference between the tilt angle of the plane πpa(i) and the tilt angle of the plane of the actual floor partial area Ar(i) is 35° or greater on the assumption that the tilt angle of the actual floor is 10° at most. Note that, however, the difference between the tilt angle of the plane πpa(i) and the tilt angle of the plane of the actual floor partial area Ar(i) does not need to be always 35° or greater, but may be 20° or greater.

By performing the process of step 5 described hereinabove for each actual floor partial area Ar(i), it is possible to estimate the shape parameters (n(i), d(i)) of each actual floor partial area Ar(i) efficiently in a short period of time.

Although the initial values (n0(i), d0(i)) are set (πpa(i) is set) by the process of steps 505 to 510 only in the case where the determination result of step 502 is YES in this embodiment, alternatively it is possible to set the initial values (n0(i), d0(i)) by performing the same process of steps 505 to 510 also in the case where the determination result of step 502 is NO. In other words, the process of steps 502 to 504 may be omitted.

Returning to the description of FIG. 3, the controller 33 subsequently performs the process of step 6. In step 6, the controller 33 removes noise components by filtering the estimated values of the shape parameters (n(i), d(i)) of each actual floor partial area Ar(i) (by the first-order lag filter or the like). This prevents the values of the shape parameters (n(i), d(i)) from excessively fluctuating under the influence of noise. In the subsequent description, it is assumed that the shape parameters (n(i), d(i)) for each actual floor partial area Ar(i) represent the estimated values filtered in step 6.

Subsequently, the controller 33 performs the process of steps 7 to 16 and then terminates the process of the current frame. In the process of steps 7 to 16, the controller 33 identifies the inclined plane edge (the inclined plane start edge or the inclined plane end edge) of the actual floor ahead in the traveling direction of the robot 1 and the like. The process of steps 7 to 16 constitutes an inclined change portion identification means in the present invention.

More specifically, first in step 7, the controller 33 divides the actual floor partial areas Ar(i) (i=1, 2, - - - , N) into two groups, the front-side group and the back-side group, so that an evaluation function described below is minimized. The front-side group means a group on the side nearer the robot 1 and the back-side group means a group on the side farther from the robot 1 than the front-side group. In other words, the process of step 7 is to determine a certain step (the Kth step) from the first to Nth steps whose predetermined landing positions are determined in step 2 in such a way that an evaluation function described below is minimized and to divide the actual floor partial areas Ar(i) (i=1, 2, - - - , N) into the front-side group consisting of the actual floor partial areas Ar(1) to Ar(K) corresponding to the predetermined landing positions of the first to Kth steps and the back-side group consisting of the actual floor partial areas Ar(K+1) to Ar(N) corresponding to the predetermined landing positions of the (K+1)th to Nth steps.

As the evaluation function used for the above division, the evaluation function represented by the following equation (2) is used in this embodiment:

$$\text{Evaluation Function} = \sum_{i=1}^{K}(m(i) - mavf)^2 + \sum_{i=K+1}^{N}(m(i) - mavb)^2 \quad (2)$$

Wherein:

$$m(i) = n(i)/d(i),$$

$$mavf = \frac{1}{K}\sum_{i=1}^{K} m(i),$$

$$mavb = \frac{1}{N-K}\sum_{i=k+1}^{N} m(i)$$

In the equation (2), mavf is more accurately a vector obtained by dividing a center vector (a unit vector having an average direction of the normal vectors n(1) to n(K)), which is obtained by spherical linear interpolation (slerp) from the normal vectors n(1) to n(K) of the shape parameters (n(i), d(i)) (i=1 to K) of the actual floor partial areas of the first to Kth steps, by a weighted average value of plane distances d(1) to d(K). Similarly, mavb is a vector obtained by dividing a center vector (a unit vector having an average direction of the normal vectors n(K+1) to n(N)), which is obtained by the spherical linear interpolation (slerp) from the normal vectors n(K+1) to n(N) of the shape parameters (n(i), d(i)) (i=K+1 to N) of the actual floor partial areas of the (K+1)th to Nth steps, by the weighted average value of plane distances d(K+1) to d(N).

The first term on the right-hand side in the above equation (2) has a meaning of distribution (the degree of variation) of the shape parameters of the Ar(1) to Ar(K) and the second term on the right-hand side has a meaning of distribution (the degree of variation) of the shape parameters of Ar(K+1) to Ar(N). In the process of step 7, the value of K is determined so that the value of the evaluation function is minimized and the actual floor partial areas Ar(i) (i=1, 2, - - - , N) are divided into two groups, the front-side group and the back-side group as described above. By the division of the actual floor partial areas Ar(1) to Ar(N) into the front-side group and the back-side group, the actual floor partial areas Ar(1) to Ar(N) are divided so that the distribution of the shape parameters in each group is minimized, in other words, so that the highest mutual approximation degree is achieved in the shape parameters in each group.

When the actual floor partial areas Ar(i) (i=1, 2, - - - , N) are divided into the front-side group and the back-side group in this manner, for example, in the situation shown in FIG. 5, the value of K becomes "5" for the minimum evaluation function of equation (2) and the actual floor partial areas are thus divided in such a way that the actual floor partial areas Ar(1) to Ar(5) of the first to fifth steps belong to the front-side group and the actual floor partial areas Ar(6) and Ar(7) of the sixth to seventh steps belong to the back-side group. In addition, for example, in the situation shown in FIG. 7, there is an inclined plane edge (an inclined plane end edge) within the actual floor partial area Ar(5) corresponding to the image projection area A(5) of the fifth step and therefore the value of K becomes "4" or "5" in the minimum evaluation function of equation (2). In this case, the actual floor partial area Ar(5) of the fifth step may belong to the front-side group in some cases or to the back-side group in other cases. Note, however, that the actual floor partial areas Ar(1) to Ar(4) of the first to fourth steps belong to the front-side group and the actual floor partial areas Ar(6) and Ar(7) of the sixth to seventh steps belong to the back-side group.

More specifically, the front-side group and the back-side group of the division in step 7 correspond to a first front-side group and a first back-side group in the present invention, respectively.

Subsequently, the controller 33 proceeds to step 8 to obtain representative values of the shape parameters of the actual floor partial areas belonging to the respective groups divided as described above and calculates an angular difference between the plane corresponding to the front-side group (hereinafter, referred to as the front-side representative plane) and the plane corresponding to the back-side group (hereinafter, referred to as the back-side representative plane) from the representative values. The front-side representative plane has a meaning of a plane typically approximating the plane including Ar(1) to Ar(K) and the back-side representative plane has a meaning of a plane typically approximating the plane including Ar(K+1) to Ar (N).

More specifically, in step 8, a pair (navf, davf) consisting of the center vector navf of the normal vectors n(1) to n(K) and the weighted average value davf of the plane distances d(1) to d(K) in the shape parameters of the actual floor partial areas Ar(1) to Ar(K) belonging to the front-side group is obtained as the representative values of the shape parameters of the front-side group. In this instance, navf/davf is the same as mavf in equation (2).

Similarly, a pair (navf, davb) consisting of the center vector navb of the normal vectors n(K+1) to n(N) and the weighted average value davb of the plane distances d(K+1) to d(N) in the shape parameters of the actual floor partial areas Ar(K+1) to Ar(N) belonging to the back-side group is obtained as the representative values of the shape parameters of the back-side group. In this instance, navb/davb is the same as mavb in equation (2).

Then, the controller 33 considers the planes defined by (navf, davf) and (navb, davb) obtained as described above as the front-side representative plane and the back-side representative plane, respectively, and calculates an angular difference between these planes.

Additionally, the angular difference obtained in step 8 has a meaning of an index representing the degree of difference between the front-side representative plane and the back-side representative plane. Besides the angular difference between the planes, the index may be a difference between the above-mentioned weighted average values davf and davb or a distance in the vector space between mavf and mavb described in relation to the above equation (2).

Moreover, the representative values (navf, davf) and (navb, davb) of the shape parameters obtained in step 8 correspond to temporary representative values in the present invention.

Subsequently, the controller 33 proceeds to step 9 to determine whether or not the angular difference obtained in step 8 is equal to or greater than a given threshold value. If the determination result is YES, the controller 33 proceeds to step 10 to calculate a temporary inclined plane edge on the assumption that an inclined plane edge exists at the intersection between the front-side representative plane and the back-side representative plane. More specifically, the controller 33 calculates the intersection between the planes from the representative values (navf, davf) of the shape parameters defining the front-side representative plane and the representative values (navb, davb) of the shape parameters defining the back-side representative plane and then considers the intersection as a temporary inclined plane edge.

The temporary inclined plane edge corresponds to a temporary inclined change portion in the present invention.

Subsequently, the controller 33 proceeds to step 11 and recalculates the representative values of the shape parameters of the front-side representative plane and the back-side representative plane and the inclined plane edge. More specifically, the controller 33 removes the actual floor partial area whose distance from the temporary inclined plane edge is shorter than a given distance (the actual floor partial area close to the temporary inclined plane edge) from the actual floor partial areas Ar(1) to Ar(K) belonging to the front-side group and considers those other than the removed actual floor partial area as the front-side group anew. Similarly, the controller 33 removes the actual floor partial area whose distance from the temporary inclined plane edge is shorter than a given distance from the actual floor partial areas Ar(K+1) to Ar(N) belonging to the back-side group and considers those other than the removed actual floor partial area as the back-side group anew. This is performed because the actual floor partial area close to the temporary inclined plane edge may possibly extend over two planes different in tilt angle of the actual floor. Then, the controller 33 obtains the representative values (navf, davf) of the shape parameters of the actual floor partial areas belonging to the front-side group determined anew as described above by the same method as in the above step 8 from the shape parameters and then considers them as the representative values of the shape parameters of the front-side representative plane anew. Similarly, the controller 33 obtains the representative values (navb, davb) of the shape parameters of the actual floor partial areas belonging to the back-side group determined anew by the same method as in the above step 8 from the shape parameters and then considers them as the representative values of the shape parameters of the back-side representative plane anew. Thereafter, the controller 33 determines the intersection between the front-side representative plane and the back-side representative plane defined by (navf, davf) and (navb, davb) obtained anew as an inclined plane edge.

The front-side representative plane and the back-side representative plane obtained as described above each have a meaning of an estimated floor. More specifically, the estimated floor on the front side of the inclined plane edge viewed from the robot 1 is represented by the front-side representative plane and the estimated floor on the back side of the inclined plane edge is represented by the back-side representative plane. In this case, the controller 33 obtains the shape parameters (navf, davf) and (navb, davb) that define the front-side representative plane and the back-side representative plane, respectively, anew after removing the actual floor partial area close to the temporary inclined plane edge in the process of step 8, which thereby increases the accuracy of the estimated floor on the front side and the back side of the inclined plane edge and which allows the inclined plane edge to be identified with accuracy.

Additionally, the process of step 11 constitutes a first inclined change portion identification means in the present invention.

Subsequently, the controller 33 proceeds to step 12 to update inclined plane parameters. The inclined plane parameters represent a macroscopic shape of the estimated floor along the traveling path of the robot 1. In step 12, more specifically, the inclined plane parameters representing the end position (the end position ahead in the traveling direction of the robot 1) of the estimated floor (the planar floor which is an estimated floor in the vicinity of the current ground contact point of the robot 1. Hereinafter, the estimated floor is referred to as the current ground contact estimated floor) in the current position of the robot 1 are updated according to the inclined plane edge obtained in step 11.

Furthermore, the inclined plane parameters representing the start position and the degree of inclination of the estimated floor (the floor different in the degree of inclination from the current ground contact estimated floor) on the back side of the end position of the current ground contact estimated floor, viewed from the robot 1, are updated according to the shape parameters (navb, davb) defining the back-side representative plane obtained in step 11.

On the other hand, if the determination result of step 9 is NO, the process of step 13 to step 16 is performed. Note that the situation where the determination result of step 9 is NO means that the actual floor partial areas Ar(i) (i=1, 2, - - - , N) exist substantially on the same plane. In the case where the degree of inclination of the actual floor ahead in the traveling direction of the robot 1 gradually changes, however, the determination result of step 9 may be NO in some cases. To cope with such a situation, the controller 33 performs the process described below if the determination result of step 9 is NO.

Thus, first in step 13, the controller 33 divides the actual floor partial areas Ar(i) (i=1, 2, - - - , N) into the front-side group and the back-side group at a given position. More specifically, the controller 33 considers the actual floor partial areas Ar(1) to Ar(Kx) of the first step to a predetermined step (the Kxth step such as, for example, the third step) as the front-side group and the actual floor partial areas Ar(Kx+1) to Ar(N) of the (Kx+1)th step to the Nth step as the back-side group, for example. Alternatively, the controller 33 can consider the actual floor partial areas corresponding to the image projection areas A(1) to A(Kx) whose distance from the current position of the robot 1 is equal to or less than a given distance in the traveling direction of the robot 1 as the front-side group and other actual floor partial areas Ar(Kx+1) to Ar(N) as the back-side group, instead of dividing the actual floor partial areas in units of steps.

Additionally, the front-side group and the back-side group into which the actual floor partial areas are divided in step 13 correspond to a second front-side group and a back-side group in the present invention.

Subsequently, the controller 33 proceeds to step 14 to calculate an angular difference between the present assumed floor in the vicinity of the current ground contact point of the robot 1 used for the current motion control of the robot 1 (hereinafter, the present assumed floor is referred to as the current ground contact assumed floor) and the plane (the back-side representative plane) corresponding to the back-side group determined in step 13. More specifically, in step 14, the controller 33 obtains the plane, which is defined by a pair (navb, davb) consisting of the center vector navb of the normal vectors n(Kx+1) to n(N) in the shape parameters of the actual floor partial areas Ar(Kx+1) to Ar(N) belonging to the back-side group and the weighted average value davb of the plane distances d(Kx+1) to d(N), as the back-side representative plane. Then, the controller 33 calculates the angular difference between the back-side representative plane and the current ground contact assumed floor.

Additionally, the angular difference obtained in step 14 has a meaning of an index representing the degree of difference between the current ground contact assumed floor and the back-side representative plane. The index can be other than the angular difference similarly to step 8.

Moreover, in the case where the shape of the floor in the vicinity of the ground contact point of the robot is estimated based on a detected value of a floor reaction force or the like as suggested by the applicant of the present application in Japanese Patent Application laid-Open No. 2001-322076, it is also possible to use the floor represented by the estimated floor shape as the current ground contact assumed floor in the process of step 14.

Subsequently, the controller 33 proceeds to step 15 to determine whether or not the absolute value of the angular difference obtained in step 14 is equal to or greater than a given threshold value similarly to step 9.

If the determination result is NO in this step, the back-side representative plane has substantially the same degree of inclination as the current ground contact assumed floor and is considered to be a plane continuous to the current ground contact assumed floor. Then, in this case, the controller 33 terminates the process of the current frame without updating the inclined plane parameters of the estimated floor.

If the determination result of step 15 is YES, the controller 33 considers the back-side representative plane to be inclined with respect to the current ground contact assumed floor and calculates the inclined plane edge. In this case, the inclined plane edge is, for example, a line perpendicular to the traveling direction of the robot 1, passing through the midpoint between the position of the heel of the foot 17 in the predetermined landing position of the Kxth step and the position of the heel of the foot 17 in the predetermined landing position of the (Kx+1)th step.

Additionally, the process of steps 14 to 16 corresponds to a process constituting a second inclined change portion identification means in the present invention.

Subsequently, the controller 33 proceeds to step 12 to update the inclined plane parameters of the estimated floor. More specifically, the controller 33 updates the inclined plane parameters representing the end position of the current ground contact estimated floor (the end position ahead in the traveling direction of the robot 1) according to the inclined plane edge obtained in step 16. In addition, the controller 33 updates the inclined plane parameters, which represent the start position and the degree of inclination of the estimated floor (the floor different in the degree of inclination from the current ground contact estimated floor) on the back side of the end position of the current ground contact estimated floor viewed from the robot 1, according to the shape parameters (navb, davb) that define the back-side representative plane obtained in step 14. In this case, the back-side representative plane has a meaning of an estimated floor on the back side of the inclined plane edge, viewed from the robot 1.

The above is the details of the floor shape estimation in this embodiment.

In this embodiment, the present assumed floor used for the motion control of the robot 1 is appropriately updated according to the inclined plane parameters of the estimated floor determined as described above. In this case, the parameters related to the degree of inclination of the current ground contact assumed floor are maintained as they are in order to increase the stability of the motion control of the robot 1. Regarding the present assumed floor on the back side of the current ground contact assumed floor (on the back side of the end position of the current ground contact estimated floor), the parameters related to the inclined plane edge position and to the degree of inclination of the back-side present assumed floor are updated so as to coincide with the estimated floor if the difference in the degree of inclination between the present assumed floor and the estimated floor is equal to or greater than a given value (for example, 1.5 degrees or more). Note that it is not indispensable to maintain the inclined plane parameters related to the degree of inclination of the current ground contact assumed floor as they are, but alternatively it is possible to update the inclined plane parameters in conformity to the degree of inclination of the current ground contact estimated floor.

In the robot 1 according to this embodiment described hereinabove, the shape parameters (n(i), d(i)) of the actual floor partial area Ar(i) are estimated by using the images captured by the cameras 27L and 27R for each actual floor partial area Ar(i) corresponding to the predetermined landing positions of the plurality of steps of the robot 1. More specifically, the shape of the actual floor is estimated only within the partial area, necessary for the moving motions of the robot 1, of the actual floor in the images captured by the cameras 27L and 27R. Thus, it becomes possible to perform appropriate movement control of the robot 1 while reducing arithmetic processing for recognizing the shape of the floor using the images captured by the cameras 27L and 27R.

While the above embodiment has been described by taking the bipedal walking robot 1 as an example, naturally the present invention is also applicable to a legged locomotion robot having three or more legs.

What is claimed is:

1. A legged locomotion robot, which is equipped with a camera for capturing surroundings including a floor ahead in a traveling direction of the robot and which moves while estimating a shape of the floor based on an image captured by the camera, comprising:

a predetermined landing position setting means which sets predetermined landing positions of a plurality of steps of legs of the robot on a present assumed floor which is the floor represented by floor shape information used for a current motion control of the robot during a movement of the robot;

an image projection area setting means which sets a flat image projection area to be projected on the image captured by the camera in a vicinity of each of the set predetermined landing positions therefor; and a floor shape estimation means which estimates shape parameters representing the shape of an actual floor partial area, which is an actual floor captured within each partial image area, for each partial image area on a basis of the image of the partial image area generated by projecting the each set image projection area on the image captured by the camera.

2. The legged locomotion robot according to claim 1, wherein each of the image projection areas includes a ground surface of the leg of the robot in the set predetermined landing position.

3. The legged locomotion robot according to claim 1, wherein the shape parameters representing the shape of the actual floor partial area captured within the each partial image area include a posture parameter which represents a spatial posture on a plane including at least the actual floor partial area and a position parameter representing a spatial position on the plane.

4. The legged locomotion robot according to claim 3, wherein the camera includes two cameras and the floor shape estimation means estimates the shape parameters of the actual floor partial area corresponding to the image projection area in such a way as to determine a projective transformation matrix capable of transforming the image of the partial image area of one camera corresponding to the image projection area to an image coincident with the image of the partial image area of the other camera for the each set image projection area.

5. The legged locomotion robot according to claim 4, wherein the floor shape estimation means regards the shape parameters of the actual floor partial area corresponding to the partial image area as variable parameters in estimating the shape parameters of the actual floor partial area corresponding to arbitrary one of the set image projection areas, performs a convergence calculation of updating values of the variable parameters from initial values in such a way as to converge a plane defined by the values of the variable parameters into a plane including the actual floor partial area, while comparing an image generated by transforming the image of the partial image area of the one camera by using a temporary projective transformation matrix, which is determined according to values of the variable parameters, with an image of the partial image area of the other camera, and determines convergence values of the variable parameters obtained by the convergence calculation as estimated values of the shape parameters of the actual floor partial area corresponding to the partial image area.

6. The legged locomotion robot according to claim 5, wherein the floor shape estimation means includes a means which sets the initial values to values satisfying a limiting condition that should be satisfied by the initial values, where the limiting condition is that the plane defined by the initial values of the variable parameters is inclined with respect to the plane including the actual floor partial area.

7. The legged locomotion robot according to claim 6, wherein the plane defined by the initial values of the variable parameters has a tilt angle with respect to its horizontal plane equal to a given angle, which has been previously determined so as to deviate from a range of values that can be used as an actual tilt angle with respect to the horizontal plane of the plane including the actual floor partial area.

8. The legged locomotion robot according to claim 3, further comprising an inclined change portion identification means which identifies an inclined change portion where a degree of inclination of an actual floor ahead in the traveling direction of the robot changes, on a basis of the estimated shape parameters of the each actual floor partial area.

9. The legged locomotion robot according to claim 8, wherein the inclined change portion identification means includes:

a means which divides the actual floor partial areas corresponding to respective image projection areas into a first front-side group located nearer to the robot and a first back-side group located farther from the robot than the first front-side group and which performs the division in such a way as to minimize a distribution of the shape parameters of the actual floor partial areas belonging to the first front-side group and the distribution of the shape parameters of the actual floor partial areas belonging to the first back-side group;

a means which determines temporary representative values of the shape parameters of the actual floor partial areas belonging to the first front-side group obtained by the division and temporary representative values of the shape parameters of the actual floor partial areas belonging to the first back-side group and determines a degree of difference between two planes defined by the temporary representative values;

a means which determines a temporary inclined change portion as temporary values of the inclined change portion on a basis of the temporary representative values that define the two planes, respectively, in a case where the degree of difference between the two planes is determined to be high; and a first inclined change portion identification means which identifies the inclined change portion on a basis of the shape parameters of the actual floor partial areas excluding an actual floor partial area close to the temporary inclined change portion from the actual floor partial areas belonging to the first front-side group and the shape parameters of the actual floor partial areas excluding an actual floor partial areas close to the temporary inclined change portion from the actual floor partial areas belonging to the first back-side group.

10. The legged locomotion robot according to claim 9, wherein the first inclined change portion identification means determines representative values of the shape parameters of the actual floor partial areas excluding the actual floor partial area close to the temporary inclined change portion from the actual floor partial areas belonging to the first front-side group and representative values of the shape parameters of the actual floor partial areas excluding the actual floor partial area close to the temporary inclined change portion from the actual floor partial areas belonging to the first back-side group and identifies an intersection between two planes defined by the representative values as the inclined change portion.

11. The legged locomotion robot according to claim 9, wherein the inclined change portion identification means includes: a means which divides the actual floor partial areas corresponding to the image projection areas, respectively, into a second front-side group located nearer to the robot than a given position and a second back-side group located farther from the robot than the second front-side group in a case where the degree of difference between the two planes defined by the temporary representative values is determined to be low; and a second inclined change portion identification means which identifies the inclined change portion on the basis of the shape parameters of the actual floor partial areas belonging to the second back-side group obtained by the division and information on the shape of a floor in the vicinity of a current ground contact point of the robot on the present assumed floor.

12. The legged locomotion robot according to claim 11, wherein the second inclined change portion identification means includes a means which determines representative values of the shape parameters of the actual floor partial areas belonging to the second back-side group and a means which determines the degree of difference between the floor in the vicinity of the current ground contact point of the robot on the present assumed floor and a plane defined by representative values of the shape parameters of the actual floor partial areas belonging to the second back-side group and, in the case where the means determines that the degree of difference between the floor and the plane is high, the second inclined change portion identification means identifies the inclined change portion on the assumption that the inclined change portion exists in the middle position between the predetermined landing position corresponding to the actual floor partial area closest to the second back-side group among the actual floor partial areas belonging to the second front-side group and the predetermined landing position corresponding to the actual floor partial area closest to the second front-side group among the actual floor partial areas belonging to the second back-side group.

* * * * *